US007236927B2

(12) United States Patent
Chen

(10) Patent No.: US 7,236,927 B2
(45) Date of Patent: Jun. 26, 2007

(54) PITCH EXTRACTION METHODS AND SYSTEMS FOR SPEECH CODING USING INTERPOLATION TECHNIQUES

(75) Inventor: Juin-Hwey Chen, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 782 days.

(21) Appl. No.: 10/284,288

(22) Filed: Oct. 31, 2002

(65) Prior Publication Data

US 2003/0149560 A1 Aug. 7, 2003

Related U.S. Application Data

(60) Provisional application No. 60/354,221, filed on Feb. 6, 2002.

(51) Int. Cl.
*G01L 11/04* (2006.01)

(52) U.S. Cl. ...................................... 704/216; 704/207

(58) Field of Classification Search .................... None
See application file for complete search history.

(56) References Cited

U.S. PATENT DOCUMENTS

| | | | | |
|---|---|---|---|---|
| 5,127,053 | A | 6/1992 | Koch | |
| 5,774,836 | A | 6/1998 | Bartkowiak et al. | |
| 5,790,759 | A * | 8/1998 | Chen | 704/200.1 |
| 5,864,795 | A | 1/1999 | Bartkowiak | |
| 5,918,223 | A | 6/1999 | Blum et al. | |
| 6,012,023 | A | 1/2000 | Iijima et al. | |
| 6,026,357 | A | 2/2000 | Ireton et al. | |
| 6,073,092 | A | 6/2000 | Kwon | |
| 6,470,309 | B1 * | 10/2002 | McCree | 704/207 |
| 2001/0023396 | A1 * | 9/2001 | Gersho et al. | 704/220 |
| 2001/0044714 | A1 | 11/2001 | Brandel et al. | |
| 2001/0044721 | A1 | 11/2001 | Yoshioka et al. | |
| 2003/0023433 | A1 | 1/2003 | Erell et al. | |
| 2003/0088401 | A1 | 5/2003 | Terez | |
| 2003/0177001 | A1 | 9/2003 | Chen | |
| 2003/0177002 | A1 | 9/2003 | Chen | |

OTHER PUBLICATIONS

"Digital Cellular Telecommunications System (Phase 2+); Half Rate Speech; Half Rate Speech Transcoding (GSM 06.20 version 8.0.0 Release 1999), Draft ETSI EN 300 969", *ETSI Standards, European Telecommunications Standards Institute*, vol. SMG11, No. V800, Jul. 2000, pp. 1-47.

(Continued)

*Primary Examiner*—Abul K. Azad
(74) *Attorney, Agent, or Firm*—Sterne, Kessler, Goldstein & Fox P.L.L.C.

(57) ABSTRACT

A method of searching for an interpolated peak of a Normalized Correlation Square (NCS) signal derived from an audio signal, comprises: producing quadratically interpolated correlation (QIC) signal values at interpolated time lags; squaring each of the QIC signal values to produce square QIC signal values; producing an individual interpolated energy signal value corresponding to each of the square QIC signal values, wherein ratios of the square QIC signal values to their corresponding interpolated energy values represent interpolated NCS signal values; and selecting, as the interpolated peak, a largest interpolated NCS signal value among the interpolated NCS signal values without evaluating the ratios.

20 Claims, 22 Drawing Sheets

Flow chart used in first-stage coarse pitch period search (block 40)

OTHER PUBLICATIONS

European Search Report issued in EP Appl. No. 03250697.4 on Jun. 16, 2004; 2 pages.
European Search Report issued in EP Appl. No. 03250690.9 on Jun. 24, 2004; 5 pages.
Lefevre, J.P., et al., Pitch Detection Based On Localization Signal, Signal Processing Theories And Applications, Barcelona, Sep. 18-21, 1990, *Proceeding of the European Signal Processing Conference*, vol. 2, Conf. 5, Sep. 18, 1990; pp. 1159-1162.
European Search Report issued in EP Appl. No. 03250696.6 on Jun. 24, 2004; 5 pages.
Chen, J.H., et al., "A Real-Time Full Duplex 16/8 KBPS CVSELP Coder With Integral Echo Canceller Implemented On A Single DSP56001", Advances In Speech Coding, Vancouver, Sep. 5-8, 1989, *Proceeding Of The Workshop On Speech Coding For Telecommunications*, 1991, pp. 299-308.
Krubsack, D.A., et al., "An Auocorrelation Pitch Detector And Voicing Decision With Confidence Measures Developed For Noise-Corrupted Speech", *IEEE Transactions On Signal Processing, IEEE, Inc.*, vol. 39, No. 2, Feb. 1, 1991, pp. 319-329.

* cited by examiner

Figure 1 Block diagram of the current invention

Figure 2 Flow chart used in first-stage coarse pitch period search (block 40)

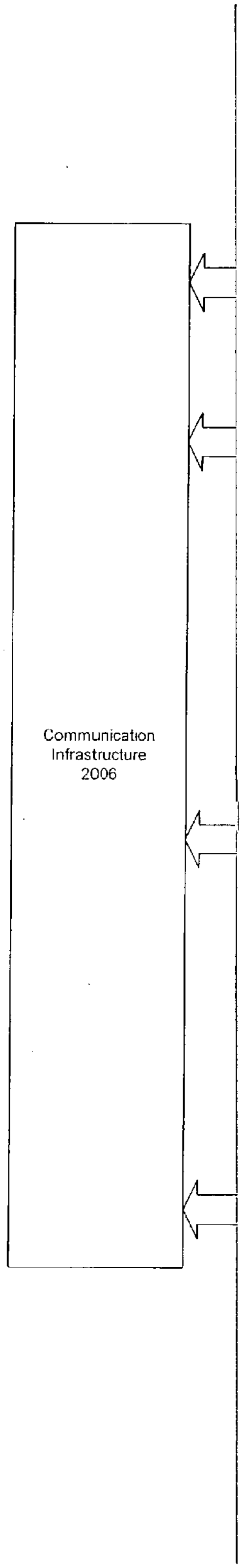
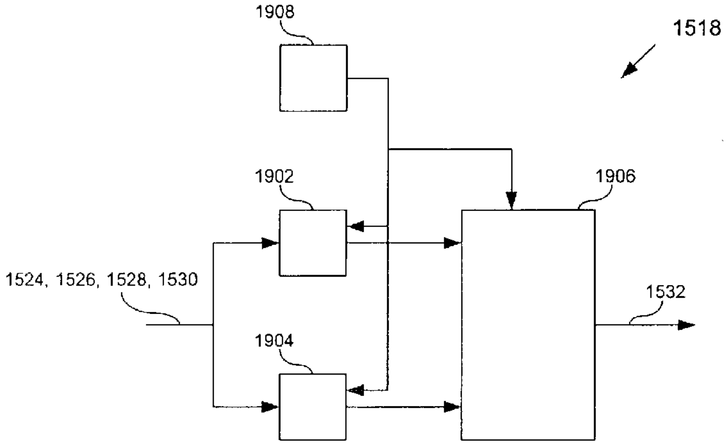
FIG. 19

PITCH EXTRACTION METHODS AND SYSTEMS FOR SPEECH CODING USING INTERPOLATION TECHNIQUES

CROSS-REFERENCE TO RELATED APPLICATIONS

This application claims priority to U.S. Provisional Application No. 60/354,221, filed Feb. 6, 2002, entitled "A Pitch Extraction Method and System For Predictive Speech Coding," incorporated herein by reference in its entirety.

BACKGROUND OF THE INVENTION

1. Field of the Invention

This invention relates generally to digital communications, and more particularly, to digital coding (or compression) of speech and/or audio signals.

2. Related Art

In the field of speech coding, the most popular encoding method is predictive coding. Most of the popular predictive speech coding schemes, such as Multi-Pulse Linear Predictive Coding (MPLPC) and Code-Excited Linear Prediction (CELP), use two kinds of prediction. The first kind, called short-term prediction, exploits the correlation between adjacent speech samples. The second kind, called long-term prediction, exploits the correlation between speech samples at a much greater distance. Voiced speech signal waveforms are nearly periodic if examined in a local scale of 20 to 30 ms. The period of such a locally periodic speech waveform is called the pitch period. When the speech waveform is nearly periodic, each speech sample is fairly predictable from speech samples roughly one pitch period earlier. The long-term prediction in most predictive speech coding systems exploits such pitch periodicity. Obtaining an accurate estimate of the pitch period at each update instant is often critical to the performance of the long-term predictor and the overall predictive coding system.

A straightforward prior-art approach for extracting the pitch period is to identify the time lag corresponding to the largest correlation or normalized correlation values for time lags in the target pitch period range. However, the resulting computational complexity can be quite high. Furthermore, a common problem is the estimated pitch period produced this way is often an integer multiple of the true pitch period.

A common way to combat the complexity issue is to decimate the speech signal, and then do the correlation peak-picking in the decimated signal domain. However, the reduced time resolution and audio bandwidth of the decimated signal can sometimes cause problems in pitch extraction.

A common way to combat the multiple-pitch problem is to buffer more pitch period estimates at "future" update instants, and then attempt to smooth out multiple pitch period by the so-called "backward tracking". However, this increases the signal delay through the system.

BRIEF SUMMARY OF THE INVENTION

The present invention achieves low complexity using signal decimation, but it attempts to preserve more time resolution by interpolating around each correlation peak. The present invention also eliminates nearly all of the occurrences of multiple pitch period using novel decision logic, without buffering future pitch period estimates. Thus, it achieves good pitch extraction performance with low complexity and low delay.

The present invention uses the following procedure to extract the pitch period from the speech signal. First, the speech signal is passed through a filter that reduces formant peaks relative to the spectral valleys. A good example of such a filter is the perceptual weighting filter used in CELP coders. Second, the filtered speech signal is properly lowpass filtered and decimated to a lower sampling rate. Third, a "coarse pitch period" is extracted from this decimated signal, using quadratic interpolation of normalized correlation peaks and elaborate decision logic. Fourth, the coarse pitch period is mapped to the time resolution of the original undecimated signal, and a second-stage pitch refinement search is performed in the neighborhood of the mapped coarse pitch period, by maximizing normalized correlation in the undecimated signal domain. The resulting refined pitch period is the final output pitch period.

The first contribution of this invention is the use of a quadratic interpolation method around the local peaks of the correlation function of the decimated signal, the method being based on a search procedure that eliminates the need of any division operation. Such quadratic interpolation improves the time resolution of the correlation function of the decimated signal, and therefore improves the performance of pitch extraction, without incurring the high complexity of full correlation peak search in the original (undecimated) signal domain.

The second contribution of this invention is a decision logic that searches through a certain pitch range in the decimated signal domain, and identifies the smallest time lag where there is a large enough local peak of correlation near every one of its integer multiples within a certain range, and where the threshold for determining whether a local correlation peak is large enough is a function of the integer multiple.

The third contribution of this invention is a decision logic that involves finding the time lag of the maximum interpolated correlation peak around the last coarse pitch period, and determining whether it should be accepted as the output coarse pitch period using different correlation thresholds, depending on whether the candidate time lag is greater than the time lag of the global maximum interpolated correlation peak or not.

The fourth contribution of this invention is a decision logic that insists that if the time lag of the maximum interpolated correlation peak around the last coarse pitch period is less than the time lag of the global maximum interpolated correlation peak and is also less than half of the maximum allowed coarse pitch period, then it can be chosen as the output coarse pitch period only if the time lag of the global maximum correlation peak is near an integer multiple of it, where the integer is one of 2, 3, 4, or 5.

An embodiment of the present invention includes a method of searching for an interpolated peak of a Normalized Correlation Square (NCS) signal derived from an audio signal. The NCS signal is represented as a first ratio of a correlation square signal $c^2(k)$ to an energy signal $E(k)$, where k represents time lags spanning a range of integer k-values. The interpolated peak is near a known local peak $c^2(k_p)/E(k_p)$ of the NCS signal. The method comprises: (a) producing quadratically interpolated correlation (QIC) signal values (ci) at interpolated time lags between time lag $k_p$ and an adjacent time lag; (b) squaring each of the QIC signal values to produce square QIC signal values ($ci^2$); (c) producing an individual interpolated energy signal value (ei) corresponding to each of the square QIC signal values, wherein second ratios of the square QIC signal values ($ci^2$) to their corresponding interpolated energy values (ei) represent interpolated NCS signal values; and (d) selecting, as the interpolated peak, a largest interpolated NCS signal value among the interpolated NCS signal values without evaluating the second ratios.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention. In the drawings, like reference numbers indicate identical or functionally similar elements. The terms "algorithm" and "method" as used herein have equivalent meanings, and may be used interchangeably.

FIG. 19 is a block diagram of an example arrangement of another module of the system of FIG. 15.

DETAILED DESCRIPTION OF THE INVENTION

In this section, an embodiment of the present invention is described. This embodiment is a pitch extractor for 16 kHz sampled speech or audio signals (collectively referred to herein as an audio signal). The pitch extractor extracts a pitch period of the audio signal once a frame of the audio signal, where each frame is 5 ms long, or 80 samples. Thus, the pitch extractor operates in a repetitive manner to extract successive pitch periods over time. For example, the pitch extractor extracts a previous or past pitch period, a current pitch period, then a future pitch period, corresponding to past, current and future audio signal frames, respectively.

To reduce computational complexity, the pitch extractor uses 8:1 decimation to decimate the input audio signal to a sampling rate of only 2 kHz. All parameter values are provided just as examples. With proper adjustments or retuning of the parameter values, the same pitch extractor scheme can be used to extract the pitch period from input audio signals of other sampling rates or with different decimation factors.

Note that the sounds of many musical instruments, such as horn and trumpet, also have waveforms that appear locally periodic with a well-defined pitch period. The present invention can also be used to extract the pitch period of such solo musical instrument, as long as the pitch period is within the range set by the pitch extractor. For convenience, the following description uses "speech" to refer to either speech or audio.

Figure 1:
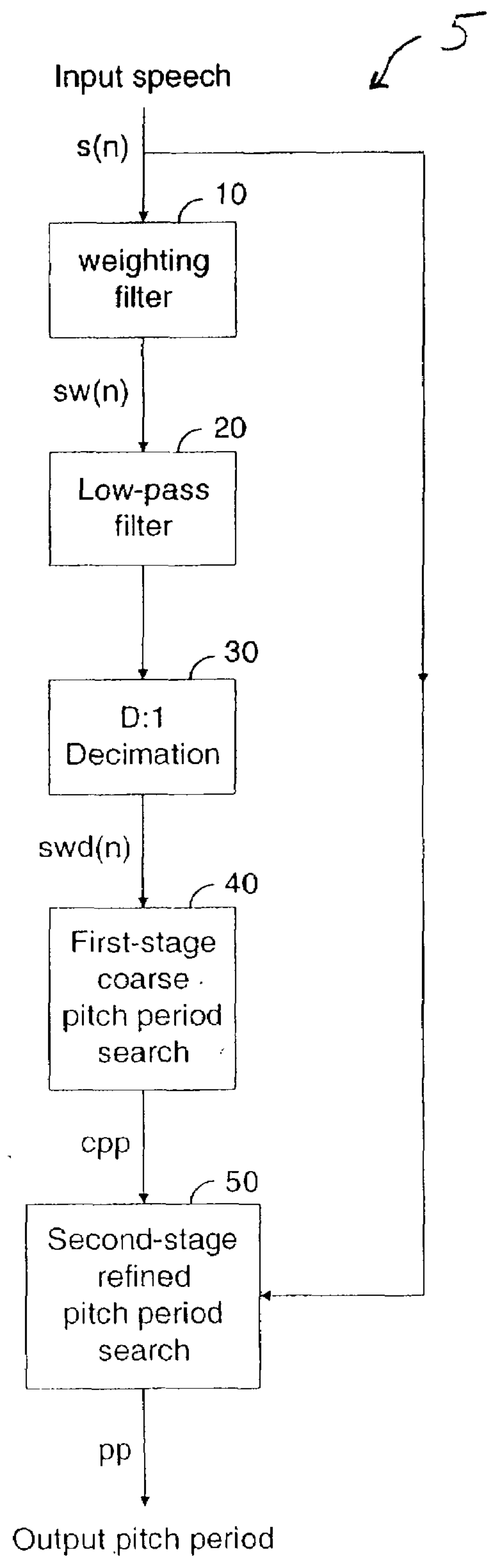
FIG. 1 is a block diagram of an example pitch extractor.

FIG. 1 is a high-level block diagram of an example pitch extractor system 5 in which embodiments of the present invention may operate. Depicted in FIG. 1 are enumerated signal processing apparatus blocks 10–50. It is to be understood that blocks 10–50 may represent either apparatus blocks or method steps/algorithms performed by such apparatus blocks. The input speech signal is denoted as s(n), where n is the sample index. The input speech signal is passed through a weighting filter (block 10). This filter generally suppresses the spectral peaks in the spectral envelope to some degree, but not completely. A good example of such a filter is the perceptual weighting filter used in CELP speech coders, which usually has a transfer function of $$W(z)=\frac{A(z/\alpha)}{A(z/\beta)}=\frac{\sum_{i=0}^{M}a_i\alpha^i z^{-i}}{\sum_{i=0}^{M}a_i\beta^i z^{-i}},$$

where $0<\beta<\alpha<1$, and $$A(z)=\sum_{i=0}^{M}a_i z^{-i}$$

is the short-term prediction error filter, M is the order of the filter, and $a_i$, i=0, 1, 2, . . . , M are the predictor coefficients.

The output signal of the weighting filter, denoted as sw(n), is passed through a fixed low-pass filter block 20, which has a −3 dB cut off frequency at about 800 Hz. A $4^{th}$-order elliptic filter is used for this purpose. The transfer function of this low-pass filter is $$H_{lpf}(z)=\frac{0.0322952-0.1028824z^{-1}+0.1446838z^{-2}-0.1028824z^{-3}+0.0322952z^{-4}}{1-3.5602306z^{-1}+4.8558478z^{-2}-2.9988298z^{-3}+0.7069277z^{-4}}$$

Block 30 down-samples the low-pass filtered signal to a sampling rate of 2 kHz. This represents an 8:1 decimation. In other words, the decimation factor D is 8. The output signal of the decimation block 30 is denoted as swd(n).

Block 40

Initial Processing

Figure 2:
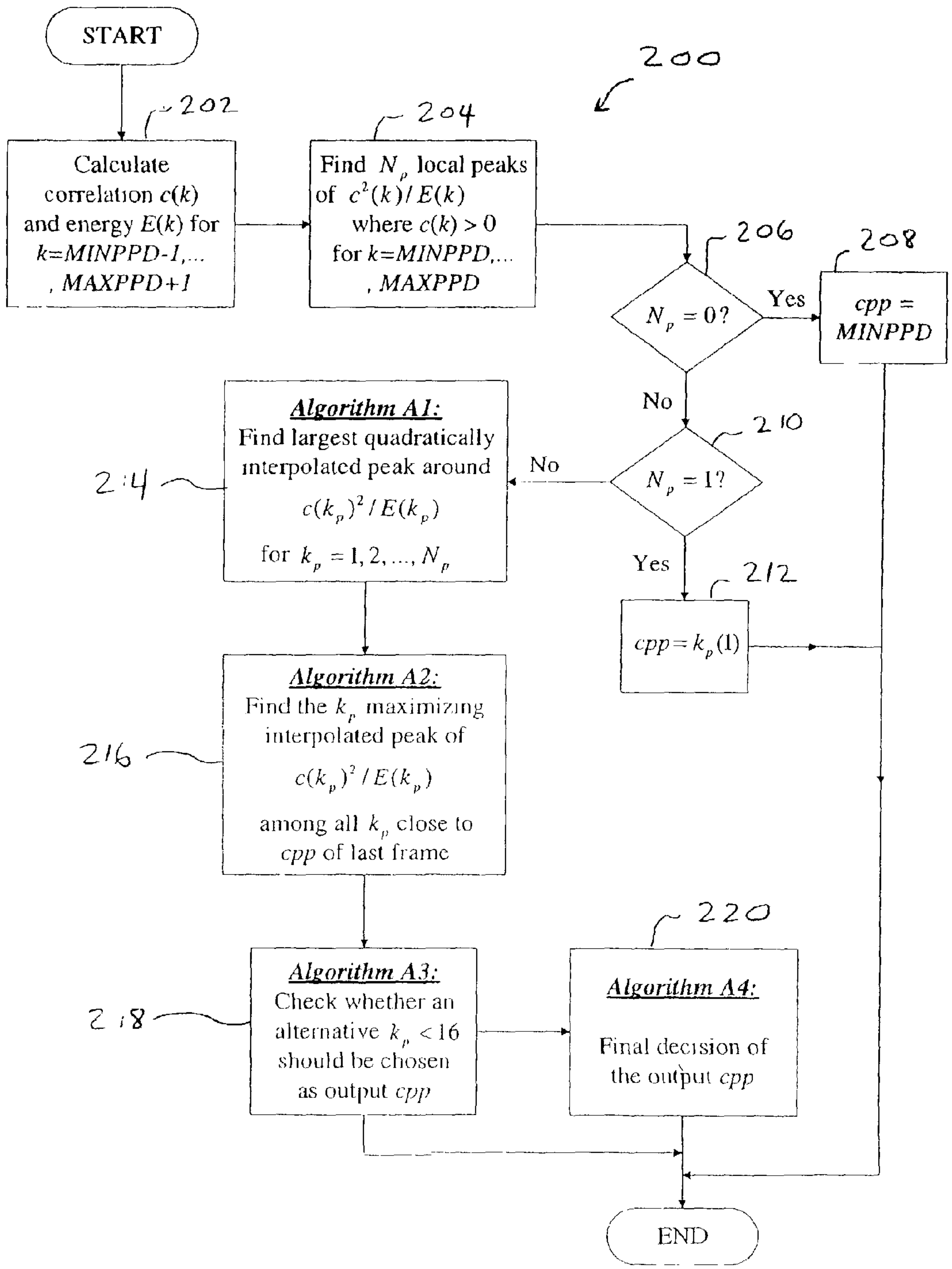
FIG. 2 is a flow chart of an example first-phase coarse pitch period searcher/determiner method performed by a portion of the pitch extractor of FIG. 1.

The first-stage coarse pitch period search block 40 then uses the decimated 2 kHz sampled signal swd(n) to find a "coarse pitch period", denoted as cpp in FIG. 1. The time lag represented by cpp is in terms of number of samples in the 2 kHz down-sampled signal swd(n). FIG. 2 is a flow chart of an example method 200 representing the signal processing, that is, method steps or algorithms, used in block 40. These algorithms are described in detail below.

Block 40 uses a pitch analysis window of 15 ms. The end of the pitch analysis window is lined up with the end of the current frame of the speech or audio signal. At a sampling rate of 2 kHz, 15 ms correspond to 30 samples. Without loss of generality, let the index range of n=1 to n=30 correspond to the pitch analysis window for swd(n). In an initial step 202, block 40 calculates the following correlation and energy values $$c(k)=\sum_{n=1}^{30} swd(n)swd(n-k)$$

$$E(k)=\sum_{n=1}^{30}[swd(n-k)]^2$$

for all integers from k=MINPPD−1 to k=MAXPPD+1, where MINPPD and MAXPPD are the minimum and maximum pitch period in the decimated domain, respectively. Example values for a wideband coder are MINPPD=1 sample and MAXPPD=33 samples.

In a next step 204, block 40 then searches through the range of k=MINPPD, MINPPD+1, MINPPD+2, . . . , MAXPPD to find all local peaks of the array $\{c^2(k)/E(k)\}$ for which c(k)>0. A local peak is a member of the array $\{c^2(k)/E(k)\}$ that has a greater magnitude than its nearest neighbors in the array (e.g., left and right members). For example, consider members of the array $\{c^2(k)/E(k)\}$ corresponding to successive time lags $k_1$, $k_2$ and $k_3$. If the member corresponding to time lag $k_2$ is greater than the neighboring members at time lags $k_1$ and $k_3$, then the member at time lag $k_2$ is a local peak in the array $\{c^2(k)/E(k)\}$.

Let $N_p$ denote the number of such positive local peaks. Let $k_p(j)$, j=1, 2, . . . , $N_p$ be the indices where $c^2(k_p(j))/E(k_p(j))$ is a local peak and $c(k_p(j))>0$, and let $k_p(1)<k_p(2)<\ldots<k_p(N_p)$. For convenience, the term $c^2(k)/E(k)$ will be referred to as the "normalized correlation square" (NCS) or NCS signal. Signals c(k), $c^2(k)$, and $c^2(k)/E(k)$ represent and are referred to herein as "correlation-based" signals because they are derived from the audio signal using a correlation operation, or include a correlation signal term (e.g., c(k)). A signal "peak" (such as a local peak in the array $c^2(k)/E(k)$, for example) inherently has a magnitude or value associated with it, and thus, the term "peak" is used herein to identify the peak being discussed, and in some contexts to mean the "peak magnitude" or "peak value" associated with the peak. For example, in the description below, if it is stated that peaks are being compared to one another or against peak thresholds, this means the magnitudes or values of the peaks are being compared to one another or against the peak thresholds. Also, each audio signal frame corresponds to a frame of the correlation-based signal, where a correlation-based signal frame includes correlation-based signal values corresponding to time lags k=MINPPD−1 to k=MAXPPD+1 for example.

Figure 3:
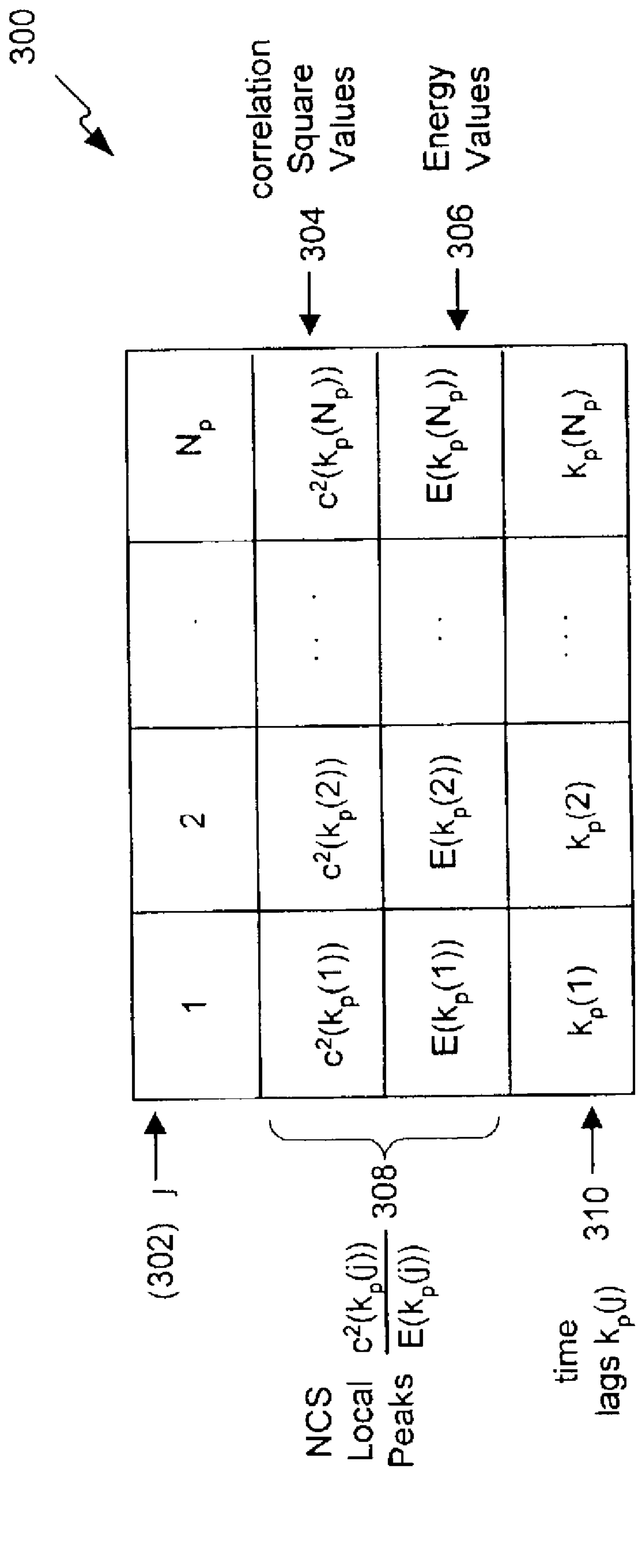
FIG. 3 is an example Results Table produced by preliminary method steps in the method of FIG. 2.

Steps 202 and 204 of block 40 produce various results, as described above and indicated in FIG. 2. These results are considered known or predetermined for purposes of their further use in subsequent methods. FIG. 3 is an example Table 300 of these results. Results Table 300 may be stored in a memory, such as a RAM, for example. Table 300 includes a first or top row of j-values 1, 2, . . . $N_p$ (302). Each j-value identifies or corresponds to a separate column of Table 300. The second row of Table 300 includes correlation square values 304 corresponding to j-values 302. The third row of Table 300 includes energy values 306 corresponding to respective ones of the j-values 302 and the correlation square values 304. Correlation square values 304 and energy values 306 together represent NCS local peaks 308. More specifically, each one of NCS local peaks 308 is represented as a ratio of one of correlation square values 304 to its corresponding one of energy values 306. A fourth or bottom row of Table 300 includes time lags ($k_p$) 310 corresponding to NCS local peaks 308.

Figure 4:
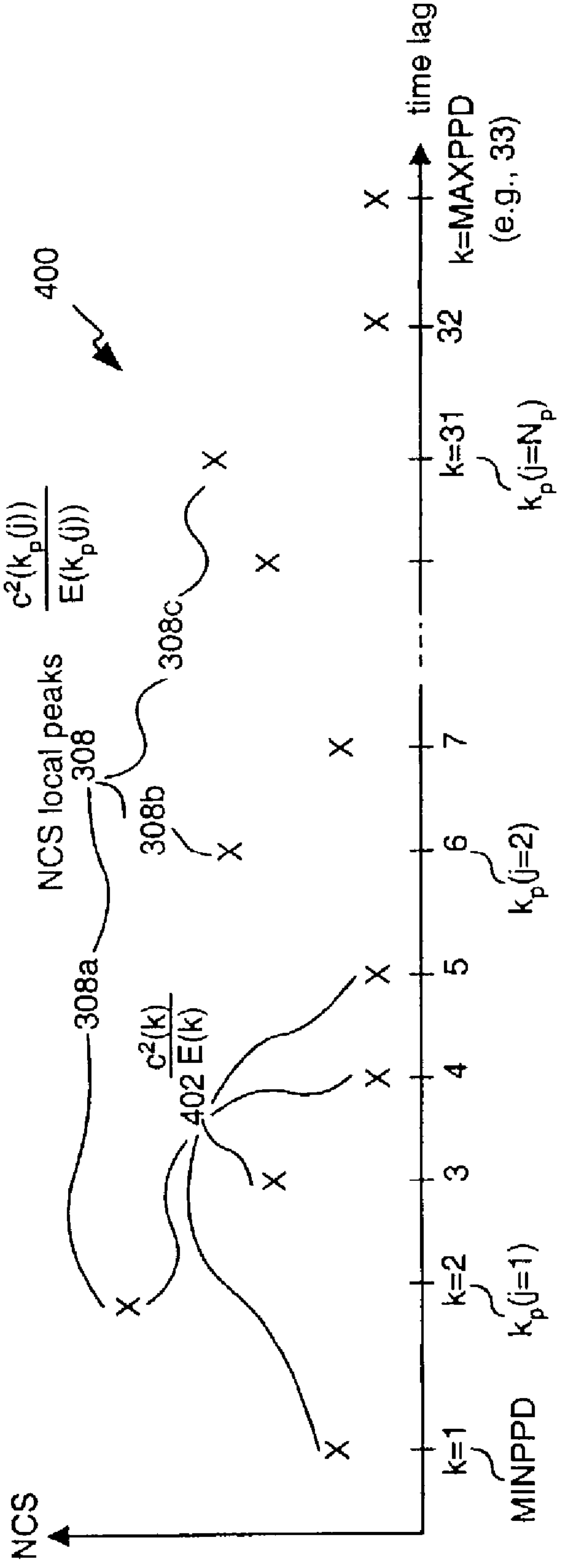
FIG. 4 is a plot of an example correlation-based signal, such as an NCS signal.

FIG. 4 is a plot of NCS magnitude (Y-axis) against time lag (X-axis) for an example NCS signal 400. NCS signal 400 includes NCS signal values 402 (represented as the ratios of correlation square values to energy values) spaced-apart in time from one another along the time lag axis. NCS signal 400 includes NCS local peaks 308, mentioned above in connection with Table 300 of FIG. 3.

Returning to the process depicted in FIG. 2, if $N_p=0$ (step 206), the output coarse pitch period is set to cpp=MINPPD (step 208), and the processing of block 40 is terminated. If $N_p=1$ (step 210), block 40 output is set to cpp=$k_p(1)$ (step 212), and the processing of block 40 is terminated.

If there are two or more local peaks ($N_p\geqq 2$) (as determined at step 210), then block 40 uses Algorithms A1, A2, A3, and A4 (each of which is described below), in that order, to determine the output coarse pitch period cpp. Results, such as variables, calculated in the earlier algorithms will be carried over and used in the later algorithms. Algorithms A1, A2, A3, and A4 operate repeatedly, for example, on a frame-by-frame basis, to extract successive pitch periods of the audio signal corresponding to successive frames thereof.

Algorithms Explanatory comments related to the Algorithms A1–A4 described below are enclosed in brackets "{}."

Algorithm A1 (Step 214)

Block 40 first uses Algorithm A1 (step 214) below to identify the largest quadratically interpolated peak around local peaks of the normalized correlation square $c(k_p)^2/E$ ($k_p$). Quadratic interpolation is performed for $c(k_p)$, while linear interpolation is performed for $E(k_p)$. Such interpolation is performed with the time resolution for the sampling rate of the input speech, which is 16 kHz in the illustrative embodiment of the present invention. In the algorithm below, D denotes the decimation factor used when decimating sw(n) to swd(n). Therefore, D=8.

Algorithm A1 Find Largest Quadratically Interpolated Peak Around $c(k_p)^2/E(k_p)$:

{At the end of Algorithm A1, c2max/Emax will have been updated to represent a global interpolated maximum NCS peak}

(i) Set c2max=−1 and set Emax=1.

{For each of the $N_p$ local peaks, do}

(ii) For j=1, 2, . . . , $N_p$, do the following 12 steps:

{a and b are coefficients used to calculate quadratically interpolated correlation values ci in step 7 or 8, below}

1. Set $a=0.5\ [c(k_p(j)+1)+c(k_p(j)-1)]-c(k_p(j))$
2. Set $b=0.5\ [c(k_p(j)+1)-c(k_p(j)-1)]$
3. Set ji=0

{ei represents a linearly interpolated energy value, however, other interpolation techniques may be used to produce the interpolated energy value, such as quadratic techniques, and so on. Note: "i" denotes an intermediate value.}

4. Set $ei=E(k_p(j))$

{c2m represents a quadratically interpolated correlation square value.

Note: "m" denotes a maximum value.}

5. Set $c2m=c^2(k_p(j))$
6. Set $Em=E(k_p(j))$

{Step 7 uses a cross-multiply compare operation to determine if right-side adjacent NCS value $c^2(k_p(j)+1)/E(k_p(j)+1)$>left-side adjacent NCS value $c^2(k_p(j)-1)/E(k_p(j)-1)$. If this is the case, then the interpolated NCS peak resides between time lags $k_p(j)$ and $k_p(j)+1$, and the remainder of step 7 generates interpolated NCS values between these time lags, and selects a maximum one of these interpolated NCS values as an interpolated NCS peak corresponding to the local peak being processed. The ratio of correlation square to energy representing the NCS signal is not actually calculated, as seen below}

7. If $c^2(k_p(j)+1)E(k_p(j)-1)>c^2(k_p(j)-1)E(k_p(j)+1)$, do the remaining part of step 7:

{Calculate linearly interpolated energy increment}

$$\Delta=[E(k_p(j)+1)-ei]/D$$

{For a plurality of interpolated time lags between $k_p(j)$ and $k_p(j)+1$, do. Note that "k" below is an integer counter indicative of interpolated time lags, and is not to be confused with time lag or index "k" above used with c(k), and so on.}

For k=1, 2, . . . , D/2, do the following indented part of step 7:

{Calculate quadratically interpolated correlation value ci at interpolated time lag k/D}

$$ci=a\ (k/D)^2+b\ (k/D)+c(k_p(j))$$

{Calculate linearly interpolated energy value corresponding to interpolated correlation value ci}Update ei as ei+Δ

{Compare the current interpolated NCS value $(ci)^2/ei$ to a current maximum NCS interpolated value (i.e., Em/c2m), to see which is larger. Use a cross-multiply compare operation to avoid actually calculating the ratios $(ci)^2/ei$ and Em/c2m. If the current NCS value is larger, then this current interpolated NCS value also becomes the current maximum NCS interpolated value.}

If $(ci)^2Em>(c2m)\ ei$, do the next three indented lines:

ji=k $c2m=(ci)^2$

Em=ei

{Step 8 is similar to step 7, except first check to see if the interpolated NCS peak resides between time lags $k_p(j)$ and $k_p(j)-1$, and if so, then generate interpolated NCS values between these time lags}

8. If $c^2(k_p(j)+1)E(k_p(j)-1)\leqq c^2(k_p(j)-1)E(k_p(j)+1)$, do the remaining part of step 8:

$$\Delta=[E(k_p(j)-1)-ei]/D$$

For k=−1, −2, . . . , −D/2, do the following indented part of step 8:

$$ci=a\ (k/D)^2+b\ (k/D)+c(k_p(j))$$

Update ei as ei+Δ

If $(ci)^2Em>(c2m)\ ei$, do the next three indented lines:

ji=k $c2m=(ci)^2$

Em=ei

{After step 7 or step 8, c2m/Em is the interpolated NCS peak at interpolated time lag (j) (see below). This interpolated NCS peak corresponds to local NCS peak $c^2(k_p(j))/E(k_p(j))$ at time lag $k_p(j)$.}

9. Set $lag(j)=k_p(j)+ji/D$
10. Set c2i(j)=c2m
11. Set Ei(j)=Em

{Step 12 compares the current NCS interpolated peak (c2i(j)/Ei(j), represented as c2m/Em) selected in either step 7 or step 8 to a current global maximum interpolated NCS peak c2max/Emax to see which is larger, using a cross-multiply multiply compare operation. If the current NCS interpolated peak is larger, then it becomes the current global maximum interpolated NCS peak.}

12. If c2m×Emax>c2max×Em, do the following three indented lines:

jmax=j c2max=c2m

Emax=Em

{At this point, c2max/Emax is the global maximum interpolated NCS peak, and jmax is the j-value identifying the corresponding interpolated NCS peak c2i(j)/Ei(j), i.e., c2i(jmax)/Ei(jmax). Step (iii) sets cpp=the time lag of the local peak corresponding to the global maximum interpolated NCS peak. This local peak is the global maximum local NCS peak}

(iii) Set the first candidate for coarse pitch period as $cpp=k_p(jmax)$.

End Algorithm A1

Figure 5:
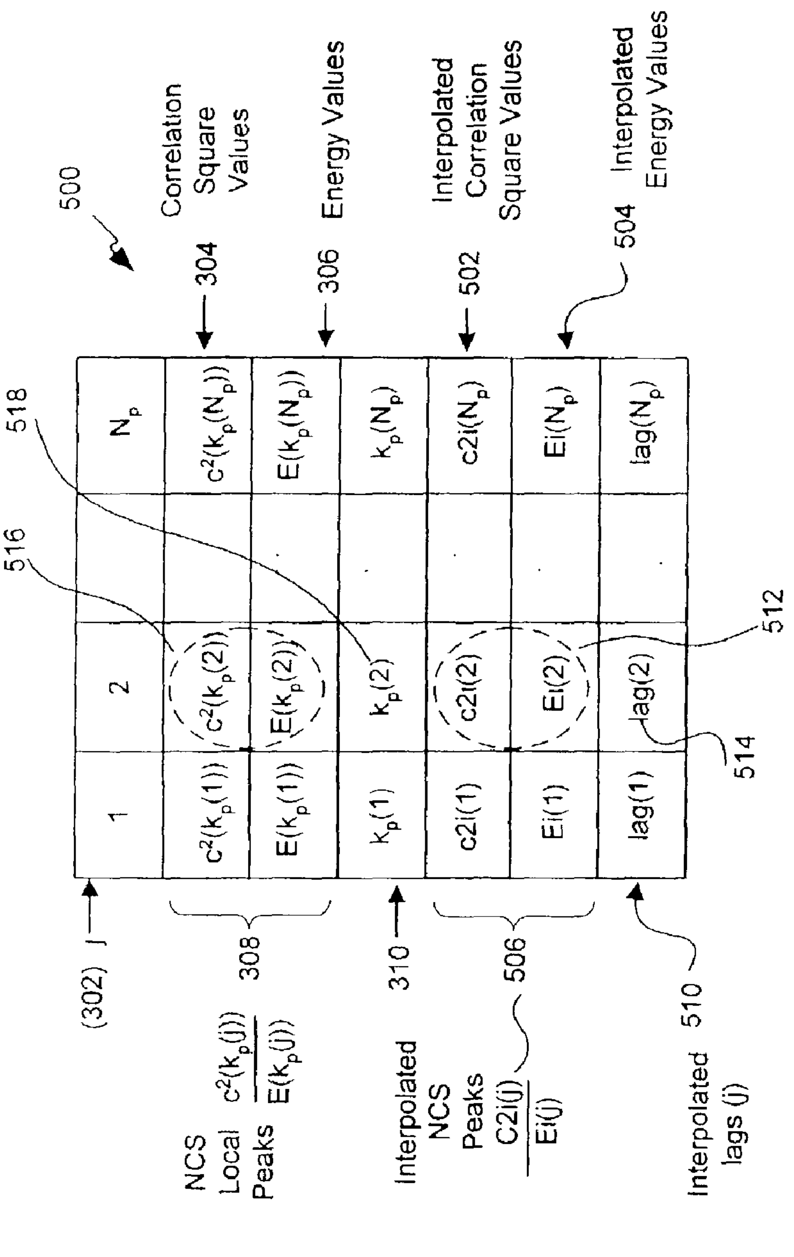
FIG. 5 is an example Results Table produced by the method of FIG. 2.

As described above, initial steps 202 and 204 of block 200 produce results stored in Results Table 300. Algorithm A1 produces further results, that may also be stored in a tabular format. FIG. 5 is an example Table 500 including such further result produced by Algorithm A1. Table 500 includes the rows of Table 300, plus a fifth row including interpolated correlation square values 502 produced in either Algorithm A1, step 7 or Algorithm A1, step 8. Table 500 includes a sixth row including interpolated energy values 504 also produced in either step 7 or step 8 of Algorithm A1. The ratios of the interpolated correlation square values 502 to corresponding ones of interpolated energy values 504 correspond to interpolated NCS peaks 506, returned at steps 10 and 11 of Algorithm A1. A seventh or bottom row of Table 500 includes interpolated lags 510 (denoted lag (j-value)), produced at Algorithm A1, step 9.

As described above, Algorithm A1 searches for, inter alia, a maximum interpolated NCS peak among interpolated NCS peaks 506 (referred to as the global maximum interpolated NCS peak c2max/Emax) and its corresponding interpolated time lag, lag (j=jmax). For example, Algorithm A1 may return interpolated NCS peak 512 (encircled by a dashed line in FIG. 5) as the global maximum interpolated NCS peak (NCS peak c2max/Emax), having a corresponding interpolated time lag 514 (lag(j=jmax)). Interpolated NCS peak 512 and interpolated time lag 514 correspond to global maximum NCS local peak 516 and its corresponding time lag 518.

Figure 6:
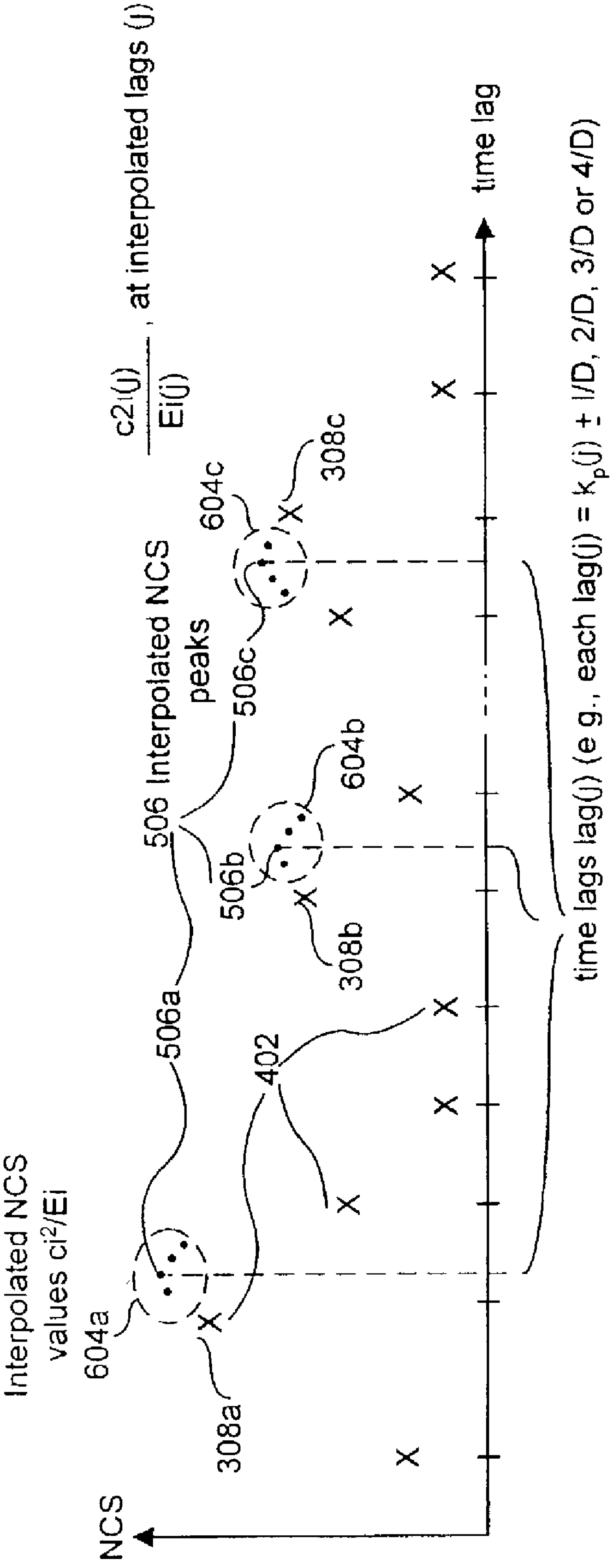
FIG. 6 is a plot of an example NCS signal including interpolated NCS values near NCS local peaks.

FIG. 6 is a plot of NCS magnitude against time lag for the example NCS signal 400, similar to the plot of FIG. 4, except the plot of FIG. 6 includes a series of interpolated NCS values 604 near each of NCS local peaks 308. Also illustrated in FIG. 6 are interpolated NCS peaks 506. Each of interpolated peaks 506 is near a corresponding one of local peaks 308.

Figure 7:
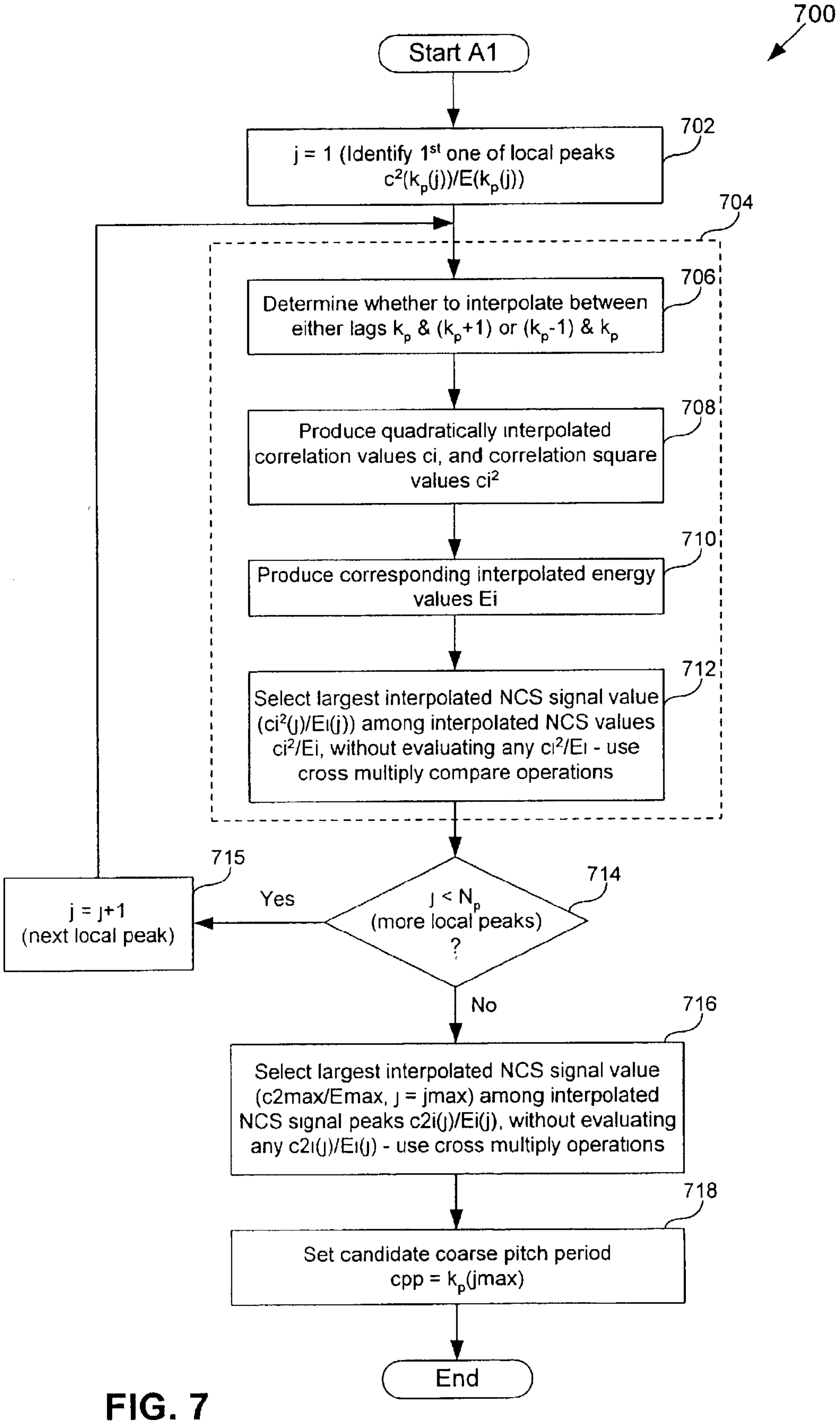
FIG. 7 is a flowchart of an example method corresponding generally to an example pitch extraction algorithm, Algorithm A1.

FIG. 7 is a flowchart of an example method 700 corresponding generally to Algorithm A1. A first step 702 corresponds to Algorithm A1, step (ii). Step 702 includes identifying an initial one of NCS local peaks 308 (e.g., local peak 308*a*) for which a corresponding interpolated NCS peak (e.g., interpolated NCS peak 506*a*) is to be found. A next step 704 corresponds generally to either of Algorithm A1, step 7 or step 8. Step 704 includes further steps 706, 708, 710 and 712.

Step 706 includes determining whether to interpolate between the time lag of the identified (that is, currently-being-processed) local peak and either an adjacent earlier time lag or an adjacent later time lag. This corresponds to the beginning "if test" of either Algorithm A1, step 7 or Algorithm A1, step 8.

Step 708 includes producing quadratically interpolated correlation values (e.g., values ci) and their corresponding interpolated correlation square values (e.g., $ci^2$).

Step 710 includes producing interpolated energy values (e.g., ei), each of the energy values corresponding to a respective one of the correlation square values (e.g., $ci^2$). The individual ratios of the interpolated correlation square values (e.g., $ci^2$) to their corresponding interpolated energy values (e.g., ei), represent interpolated NCS signal values (e.g., the ratios represent interpolated NCS signal values 604*a* ($ci^2$/ei), in FIG. 6).

Step 712 includes selecting a largest interpolated NCS signal value (e.g., interpolated NCS peak 506*a*) among the interpolated NCS values (e.g., among interpolated NCS values 604*a*). Step 712 includes performing cross-multiply compare operations between different interpolated NCS values in each group of interpolated NCS values (e.g., in the group of interpolated NCS values 604*a*). In this manner, the ratio representing the interpolated NCS peak 506*a* need not be evaluated or computed.

A next step 714 includes determining if further local peaks among local peaks 308 are to be processed. If further local peaks are to be processed, then a next local peak is identified at step 715, and step 704 is repeated for the next local peak. If all of local peaks 308 have been processed, flow control proceeds to step 716.

Upon entering step 716, interpolated NCS peaks 506 corresponding to each of NCS local peaks 308 have been selected, along with their corresponding interpolated time lags 510. Step 716 includes selecting a largest interpolated NCS peak (for example, interpolated NCS peak 512 in Table 5) among interpolated NCS peaks 506. Step 716 performs this selection using cross-multiply compare operations between different ones of interpolated NCS peaks 506 so as to avoid actually calculating any NCS ratios.

Step 718 includes returning the time lag (e.g., 518) of the local peak (e.g., 516) corresponding to the largest interpolated NCS peak (e.g., peak 512), selected in step 716, as a candidate coarse pitch period (e.g., cpp) of the audio signal. The term "returning" means setting the variable cpp equal to the just-mentioned time lag.

Algorithm A2 (Step 216)

To avoid picking a coarse pitch period that is around an integer multiple of the true coarse pitch period, Algorithm A2 (step 214) performs a search through the time lags corresponding to the local peaks of $c(k_p)^2/E(k_p)$ to see if any of such time lags is close enough to the output coarse pitch period of block 40 in the last frame of the correlation-based signal (that corresponds to the last frame of the audio signal), denoted as cpplast. If a time lag is within 25% of cpplast, it is considered close enough. For all such time lags within 25% of cpplast, the corresponding quadratically interpolated peak values of the normalized correlation square $c(k_p)^2/E(k_p)$ are compared, and the interpolated time lag (e.g., time lag lag(im) from Algorithm A2 below) corresponding to the maximum normalized correlation square (e.g., c2m/Em=c2i(im)/Ei(im) from Algorithm A2 below) is selected for further consideration. Algorithm A2 below performs the task described above. The interpolated arrays c2i(j) and Ei(j) calculated in Algorithm A1 above (see Results Table 5) are used in this algorithm.

Algorithm A2 Find the time lag maximizing interpolated $c(k_p)^2/E(k_p)$ among all time lags close to the output coarse pitch period of the last frame:

(i) Set index im=−1

(ii) Set c2m=−1

(iii) Set Em=1

{For each of time lags $k_p(j)$ 310, do)

(iv) For j=1, 2, . . . , $N_p$, do the following:

{If the currently-being-processed time lag $k_p(j)$ is within a predetermined time lag range, that is, near, the previously determined pitch period cpplast, then do}

If $|k_p(j)-cpplast| \leqq 0.25 \times cpplast$, do the following:

{If the interpolated NCS peak corresponding to (that is, next to) the currently-being-processed local peak near cpplast>a current maximum interpolated NCS peak near cpplast, then set the currently-being-processed interpolated NCS peak to the current maximum. This step includes performing the comparison c2i(j)/Ei(j) >c2m/Em using a cross-multiply compare operation.}

If c2i(j)×Em>c2m×Ei(j), do the following three lines:

im=j c2m=c2i(j)

Em=Ei(j)

End Algorithm A2

Note that if there is no time lag $k_p(j)$ within 25% of cpplast, then the value of the index im will remain at −1 after Algorithm A2 is performed. If there are one or more time lags within 25% of cpplast, the index im corresponds to the largest normalized correlation square among such time lags.

Figure 8:
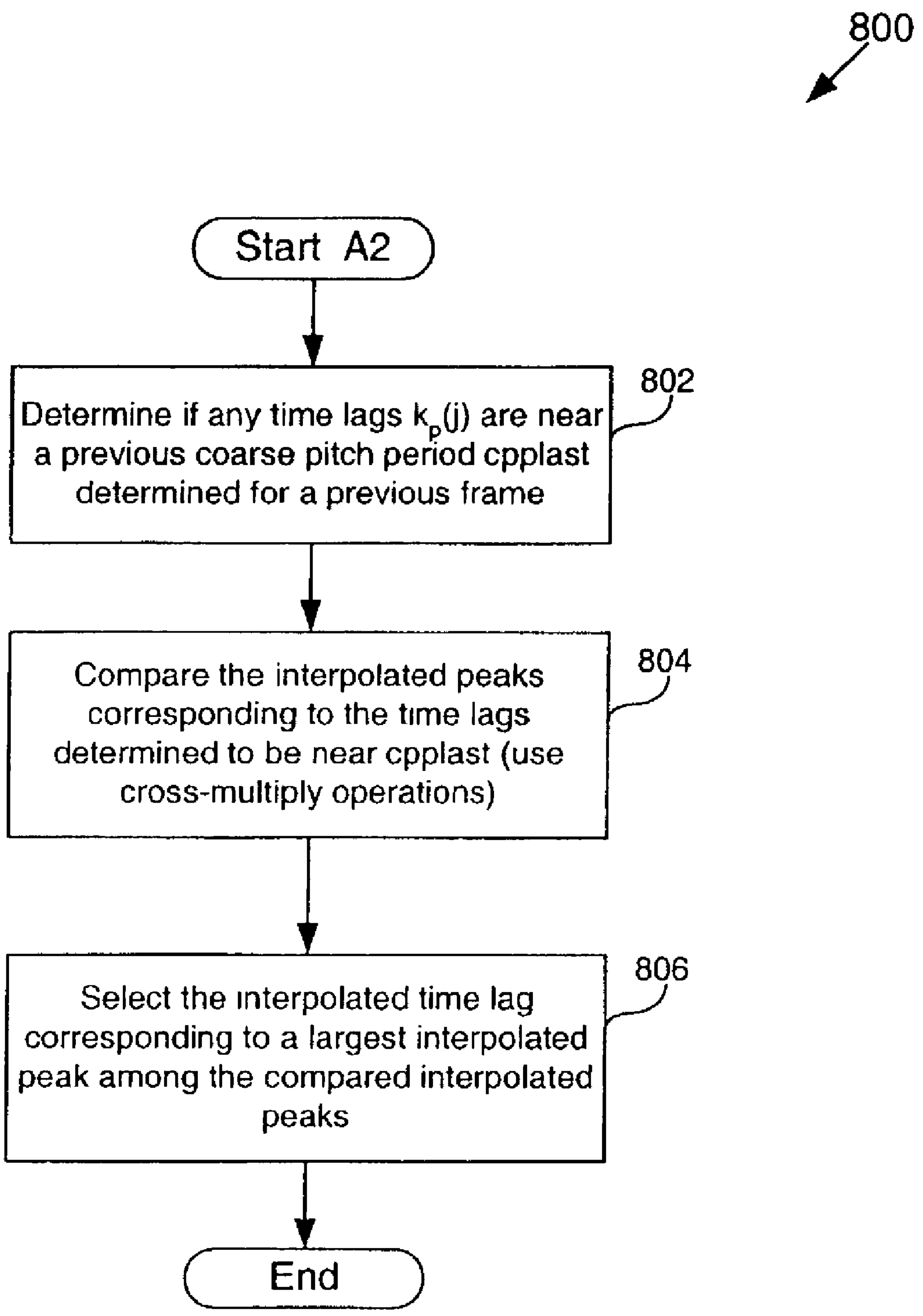
FIG. 8 is a flowchart of an example method corresponding generally to an example pitch extraction algorithm, Algorithm A2.

FIG. 8 is a flowchart of an example method 800 corresponding generally to Algorithm A2. A first step 802 includes determining if any time lags among time lags 310 are near previously determined pitch period cpplast. Pitch period cpplast was determined for a previous frame of the audio signal.

A next step 804 includes comparing the interpolated NCS peaks corresponding to those time lags determined to be near previously determined pitch period cpplast from step 802. Step 804 includes comparing the interpolated peaks to one another using cross-multiply compare operations.

A next step 806 includes selecting the interpolated time lag corresponding to a largest interpolated peak among the compared interpolated peaks from step 804.

Algorithm A3 (Step 218)

Next, Algorithm A3 (step 218) of block 40 determines whether an alternative time lag in the first half of the pitch range should be chosen as the output coarse pitch period. Basically, Algorithm A3 searches through all interpolated time lags lag(j) that are less than a predetermined time lag, such as 16, and checks whether any of them has a large enough local peak of normalized correlation square near every integer multiple of it (including itself) up to twice the predetermined time lag, such as 32. If there are one or more such time lags satisfying this condition, the smallest of such qualified time lags is chosen as the output coarse pitch period of block 40. This search technique for pitch period extraction is referred to herein as "pitch extraction using multiple time lag extraction" because of the use of the integer multiples of identified time lags.

Again, variables calculated in Algorithms A1 and A2 above carry their final values over to Algorithm A3 below. In the following, the parameter MPDTH is 0.06, and the threshold array MPTH(k) is given as MPTH(2)=0.7, MPTH (3)=0.55, MPTH(4)=0.48, MPTH(5)=0.37, and MPTH(k) =0.30, for k>5, where MPTH stands for Multiple Pitch Period Threshold.

Algorithm A3 Check whether an alternative time lag in the first half of the range of the coarse pitch period should be chosen as the output coarse pitch period:

{Outer loop: Process each time lag separately, and in an order of increasing time lag beginning with the smallest time lag.}

For j=1, 2, 3, . . . , in that order, do the following while lag(j)<16:

{If the currently-being-processed time lag is not the time lag (lag(im)) near the previously determined pitch period cpplast (determined in Algorithm A2), then set a higher peak threshold to overcome. In other words, Algorithm A3 favors the time lag selected in Algorithm A2 near the previously determined pitch period cpplast, when it exists, over other time lags.}

(i) If j≠im, set threshold=0.73; otherwise, set threshold=0.4.

{Step (ii) below determines if the currently-being-processed time lag qualifies for further testing. Step (ii) includes determining if the peak corresponding to the currently-being-processed time lag exceeds a threshold based on the threshold set in step (i). If yes (the time lag is qualified), then go on to step (iii) a), below. If no, continue to process/examine the next time lag and its corresponding peak.

(ii) If c2i(j)×Emax≦threshold×c2max×Ei(j), disqualify this j, skip step (iii) for this j, increment j by 1 and go back to step (i).

{If the time lag/peak qualified, then begin at step (iii) a) below}

(iii) If c2i(j)×Emax>threshold×c2max×Ei(j), do the following:

{Set up an individual time window coinciding with each one of integer multiples of the time lag (e.g., a first time window coinciding with 2×lag(j), a second time window coinciding with 3×lag(j), and so on). Each time window extends between a lower bound a and an upper bound b. Then determine if there exists a respective, sufficiently large peak near each of the integer multiples of lag(j), that is, having a time lag falling within the time window}. For example, determine if there is (i) a first sufficiently large peak within a first predetermined time range (i.e., first time window) of 2×lag(j), (ii) a second sufficiently large peak within a second predetermined time range (i.e., a second time window) of 3×lag(j), and so on.

a) For k=2, 3, 4, . . . , do the following while k×lag(j)<32:
 1. s=k×lag(j)
 2. a=(1−MPDTH) s
 3. b=(1+MPDTH) s
 4. Go through m=j+1, j+2, j+3, . . . , $N_p$, in that order, and see if any of the time lags lag(m) is between a and b. If none of them is between a and b, disqualify this j, stop step (iii), increment j by 1 and go back to step (i). If there is at least one such m that satisfies a<lag(m)≦b and c2i(m)×Emax>MPTH(k)×c2max×Ei(m), then it is considered that a large enough peak of the normalized correlation square is found in the neighborhood of the k-th integer multiple of lag(j); in this case, stop step (iii) a) 4., increment k by 1, and go back to step (iii) a) 1.

b) If step (iii) a) is completed without stopping prematurely, that is, if there is a large enough interpolated peak of the normalized correlation square within ±100×MPDTH % of every integer multiple of lag(j) that is less than 32, then stop this algorithm and stop the operation of block 40, and set cpp=$k_p$(j) as the final output coarse pitch period of block 40.

End Algorithm A3

Figure 9:
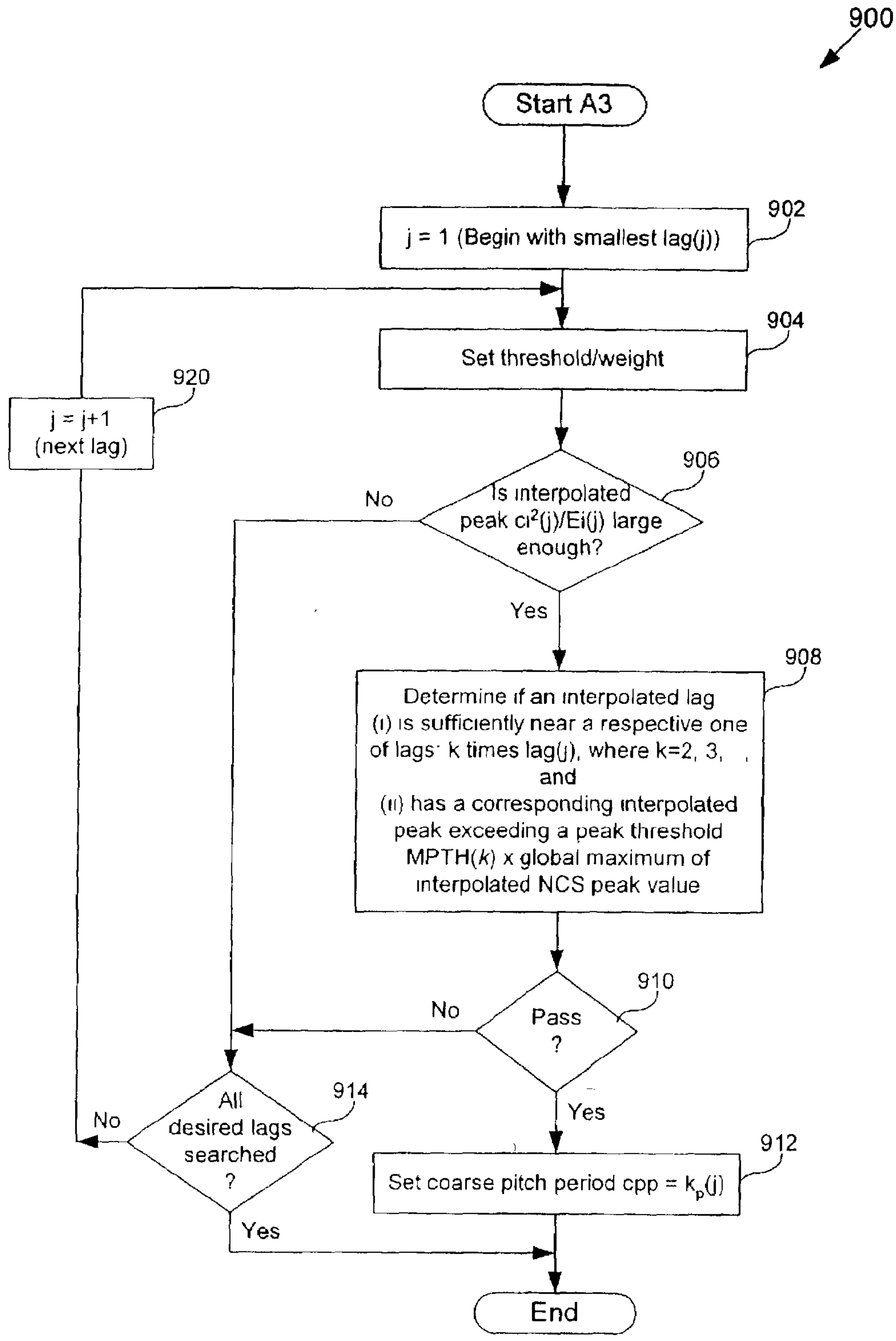
FIG. 9 is a flowchart of an example method corresponding generally to an example pitch extraction algorithm, Algorithm A3.

FIG. 9 is a flowchart of an example method 900 corresponding generally to Algorithm A3. Method 900 processes each of interpolated time lags, lag (j), individually, and in an order of increasing time lag beginning with the smallest time lag, as identified in a step 902.

A next step 904 includes setting a threshold or weight depending on whether the identified interpolated time lag (that is, the time lag currently-being-processed) is the time lag, lag(im), determined in Algorithm A2. Step 904 corresponds to Algorithm A3, step (i).

A next step 906 includes determining if the identified interpolated time lag qualifies for further testing. This includes determining if the interpolated peak corresponding to the identified time lag is sufficiently large, that is, exceeds, a threshold based on the weight set in step 904 and the global maximum interpolated NCS peak 512. Step 906 corresponds to Algorithm A3, step (ii).

If the identified interpolated time lag qualifies for further testing, then flow proceeds to step 908. Step 908 includes determining if there is an interpolated time lag among interpolated time lags 510 that (i) is sufficiently near a respective one of one or more integer multiples of the identified interpolated time lag, and (ii) corresponds to an interpolated NCS peak exceeding a peak threshold. For the determination of step 908 to pass (that is, to evaluate as "True"), each of the above-listed test conditions (i) and (ii) of step 908 must be satisfied for each of the integer multiples k. Step 908 corresponds to Algorithm A3, steps a) 1., a)2., a)3., and portions of step a)4.

A next step 910 tests whether the determination of step 908 passed. If the determination of step 908 passed, then flow proceeds to a step 912. Step 912 includes setting the pitch period to the time lag $k_p(j)$ corresponding to the identified interpolated time lag, lag(j). Step 912 corresponds to Algorithm A3, step (iii)b).

Returning to step 906, if the identified interpolated lag does not qualify for further testing, then flow proceeds to a step 914. Similarly, if the determination in step 908 failed, then flow also proceeds to step 914.

Step 914 includes determining whether a desired number, which may be all, of the interpolated time lags have been tested or searched by Algorithm A3. If the desired number of interpolated time lags have been tested or searched, then Algorithm A3 ends. Conversely, if further time lags are to be searched, then the next time lag is identified at step 920, and flow proceeds back to step 904.

Figure 10:
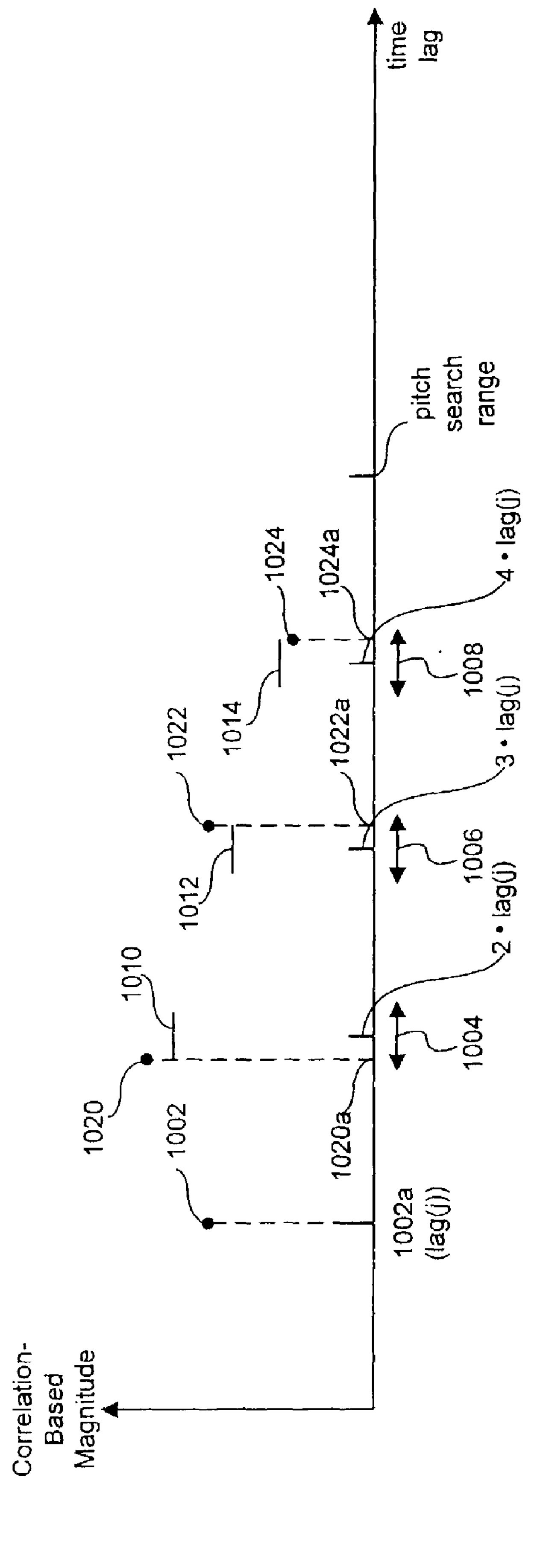
FIG. 10 is an example plot of portions of an NCS signal useful for describing portions of Algorithm A3.

FIG. 10 is an example plot of correlation-based magnitude (such as NCS magnitude, for example) against time lag, which serves as a useful illustration of portions of Algorithm A3. Assume step 902 or 920 identifies a time lag 1002*a* (lag(j)) to be tested, where the time lag corresponds to a peak 1002. Assume Algorithm A3, steps (iii)a)1.–(iii)a)3., generate successive time windows 1004, 1006 and 1008 coinciding with respective successive time lags: 2×lag (j); 3×lag (j); and 4×lag (j), where the multipliers 2, 3 and 4 are representative of an integer multiplier or counter k.

Also assume Algorithm A3, step (iii)a)4. uses, or generates and uses successive peak thresholds 1010, 1012 and 1014 corresponding to respective time windows 1004, 1006 and 1008, according to threshold function MPTH(k)×c2max/Emax. Thus, peak thresholds 1010–1014 are a function of the identified time lag multiple k.

For step 908 to pass, there must exist peaks and their corresponding time lags (among the peaks and time lags of Tables 3 and 5, for example) that meet both conditions (i) and (ii) of step 908. For example, assume there exist peaks 1020, 1022 and 1024 corresponding to respective time lags 1020*a*, 1022*a* and 1024*a*, that fall within respective time windows 1004, 1006, and 1008. Thus, in the scenario depicted in FIG. 10, the first condition (i) of step 908 is satisfied. Note that if one or more of the time windows did not coincide with a respective time lag, then condition (i) of step 908 would not be satisfied, and the determination of step 908 would fail.

For step 908 to pass, condition (ii) must also be satisfied. That is, each of peaks 1020, 1022 and 1024 must be sufficiently large, that is, must exceed its respective one of peak thresholds 1010, 1012 and 1014. As seen in FIG. 10, peak 1024 falls below its respective peak threshold 1014. Thus, condition (ii) of step 908 is not satisfied, and the determination of step 908 fails. On the other hand, if peak 1024 were above its respective peak threshold 1014, then there would be a sufficiently large peak sufficiently near each integer multiple of identified lag(j), and both conditions (i) and (ii) of step 908 would be met, that is, the determination of step 908 would pass (i.e., evaluate to "True").

Algorithm A4 (Step 220)

If Algorithm A3 above is completed without finding a qualified output coarse pitch period cpp, then block 40 examines the largest local peak of the normalized correlation square around the coarse pitch period of the last frame, found in Algorithm A2 above, and makes a final decision on the output coarse pitch period cpp using Algorithm A4 (step 220) below. Again, variables calculated in Algorithms A1 and A2 above carry their final values over to Algorithm A4 below. In the following, the parameters are SMDTH=0.095 and LPTH1=0.78.

Algorithm A4 Final decision of the output coarse pitch period:

(i) If im=−1, that is, if there is no large enough local peak of the normalized correlation square around the coarse pitch period of the last frame, then use the cpp calculated at the end of Algorithm A1 as the final output coarse pitch period of block 40, and exit this algorithm.

(ii) If im=jmax, that is, if the largest local peak of the normalized correlation square around the coarse pitch period of the last frame is also the global maximum of all interpolated peaks of the normalized correlation square within this frame, then use the cpp calculated at the end of Algorithm A1 as the final output coarse pitch period of block 40, and exit this algorithm.

(iii) If im<jmax, do the following indented part:

If c2m×Emax>0.43×c2max×Em, do the following indented part of step (iii):

a) If lag(im)>MAXPPD/2, set block 40 output cpp=$k_p$(im) and exit this algorithm.

b) Otherwise, for k=2, 3, 4, 5, do the following indented part:

1. s=lag(jmax)/k
2. a=(1−SMDTH) s
3. b=(1+SMDTH) s
4. If lag(im)>a and lag(im)<b, set block 40 output cpp=$k_p$(im) and exit this algorithm.

(iv)If im≦jmax, do the following indented part:

If c2m×Emax>LPTH1×c2max×Em, set block 40 output cpp=$k_p$(im) and exit this algorithm.

(v) If algorithm execution proceeds to here, none of the steps above have selected a final output coarse pitch period. In this case, just accept the cpp calculated at the end of Algorithm A1 as the final output coarse pitch period of block 40.

End Algorithm A4

Figure 11A:
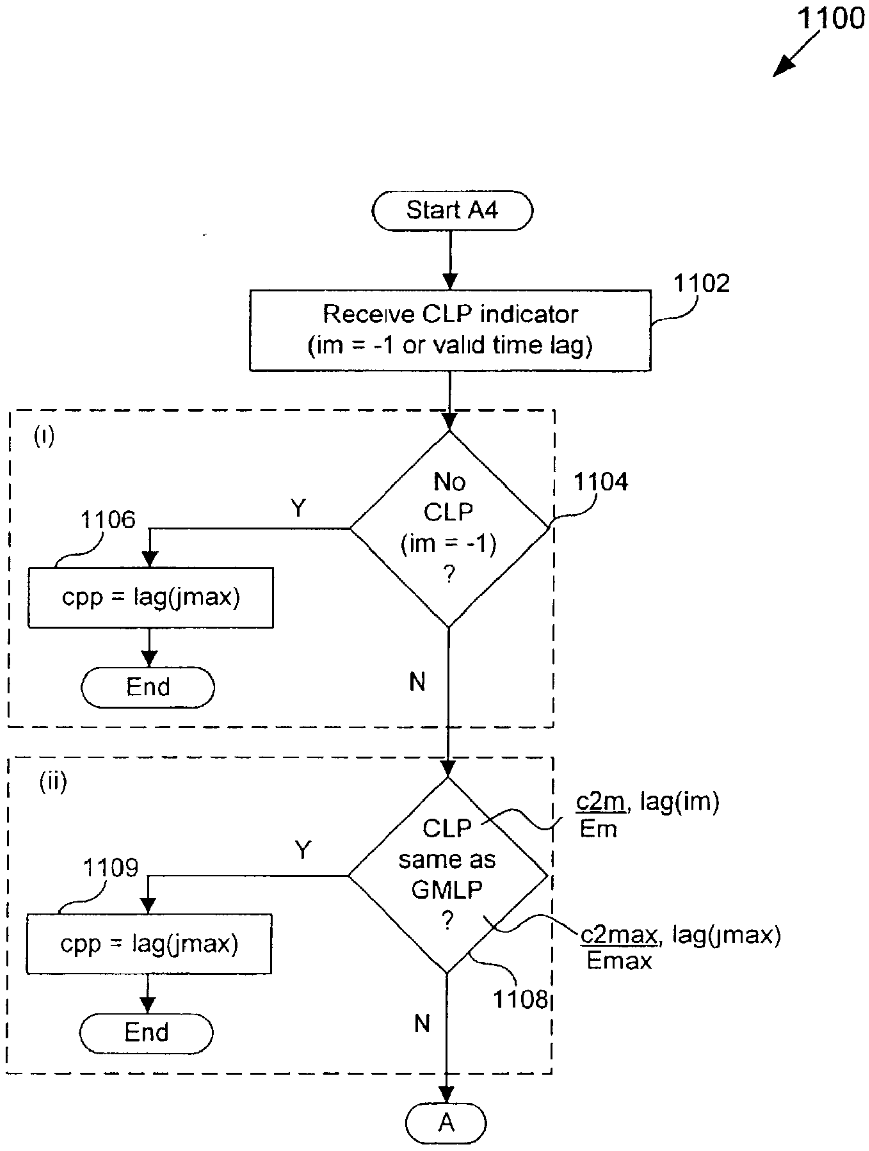
FIGS. 11A and 11B are flowcharts that collectively represent an example method corresponding to an example pitch extraction algorithm, Algorithm A4.
Figure 11B:
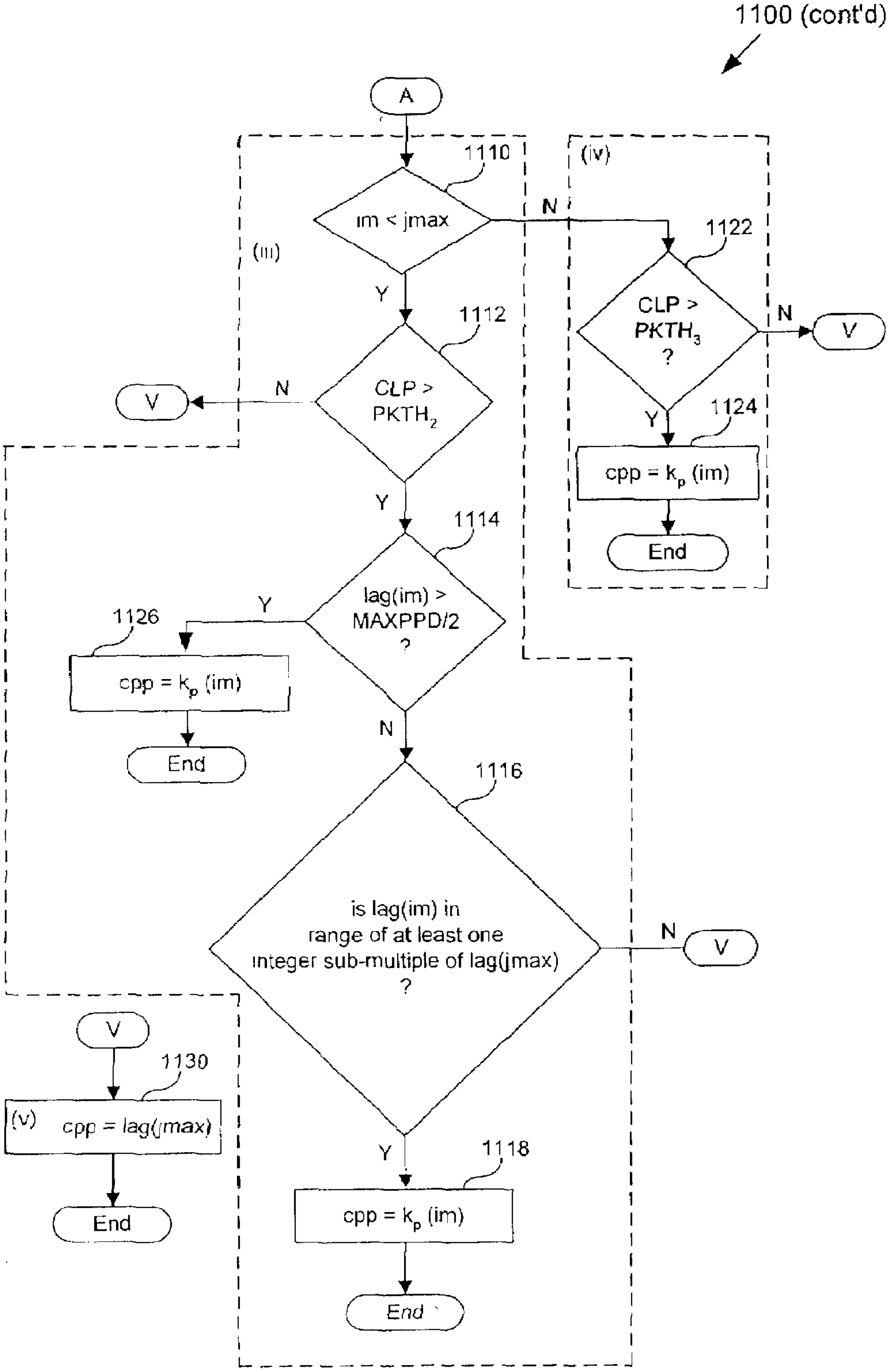

FIGS. 11A and 11B are flowcharts that collectively represent an example method 1100 corresponding to Algorithm A4. A first step 1102 includes receiving, accessing or retrieving a candidate local peak (CLP) indicator, such as indicator im produced in Algorithm A2. As described above Algorithm A2 searches for a sufficiently large local peak positioned near (that is, within a predetermined time lag range of) a previously determined pitch period of the audio signal. Such a peak, when found, is referred to as a candidate local peak (CLP). Algorithm A2 returns a CLP indicator (e.g., variable im) indicating whether a CLP was found. The CLP indicator (e.g., variable im) has either:

(i) a first indicator value indicating a CLP exists (e.g., im=a valid time lag or time lag index corresponding to a found CLP); or (ii) a second indicator value indicating that no CLP exists (e.g., im=an invalid time lag or time lag index, such as "−1"). The first and second CLP indicator values are equivalently referred to herein as first and second CLP indicators, respectively.

A next step 1104 includes determining which of the first and second CLP indicators (e.g., indicator values) was received in step 1102. If the second CLP indicator was received, then a step 1106 includes setting the pitch period equal to the time lag corresponding to the global maximum local peak. Steps 1104 and 1106 correspond to Algorithm A4, step (i).

If the first CLP indicator was received in step 1102, then a next step 1108 includes determining if the CLP is the same as the global maximum local peak. If this is the case, then a step 1109 includes setting the pitch period equal to the time lag corresponding to the global maximum local peak. Steps 1108 and 1109 correspond to Algorithm A4, step (ii).

If step 1108 determines that the CLP is not the same as the global maximum local peak, then flow proceeds to a next step 1110 (FIG. 11B). Step 1110 includes determining if the time lag corresponding to the CLP is less than the time lag corresponding to the global maximum local peak. If the determination of step 1110 is true, then a next step 1112 includes determining if the CLP exceeds a peak threshold $PKTH_2$ (where $PKTH_2$=0.43×c2max/Emax, in Algorithm A4, step (iii)). If the CLP exceeds the peak threshold, then a next step 1114 includes determining if the time lag of the CLP is greater than a predetermined pitch period search range (Algorithm A4, step (iii)a)). If the determination of step 1114 is false, then a next step 1116 includes determining if the time lag corresponding to the CLP is near (that is, within a predetermined range of) at least one integer sub-multiple of the time lag corresponding to the global maximum local peak (Algorithm A4, step (iii)b)). If the determination of step 1116 returns True (i.e., passes), then a next step 1118 includes setting the pitch period equal to the time lag of the CLP (Algorithm A4, step (iii)b)).

Returning to step 1110, if the time lag corresponding to the CLP is not less than the time lag corresponding to the global maximum local peak, then flow proceeds to a step 1122. Step 1122 includes determining if the CLP exceeds a peak threshold $PKTH_3$ (where $PKTH_3$=LPTH1×c2max/Emax, in Algorithm A4, step (iv)). If the determination of step 1122 is false, then flow proceeds to a step V. If the determination of step 1122 is true, then a next step 1124 includes setting the pitch period equal to the time lag corresponding to the CLP.

Returning to step 1112, if the determination of step 1112 is false, the flow proceeds to step V.

Returning to step 1114, if the determination of step 1114 is true, then flow proceeds to a next step 1126. At step 1126, the pitch period is said equal to the time lag corresponding to the CLP.

Step V includes a step 1130. Step 1130 includes setting the pitch period equal to the time lag corresponding to the global maximum local peak. Referring to FIG. 11B, steps 1110, 1112, 1114, 1116, 1118 and 1126 correspond generally to Algorithm A4, step (iii). Steps 1122 and 1124 correspond generally to Algorithm A4, step (iv). Also, step 1130 corresponds to Algorithm A4, step (v).

Figure 11C:
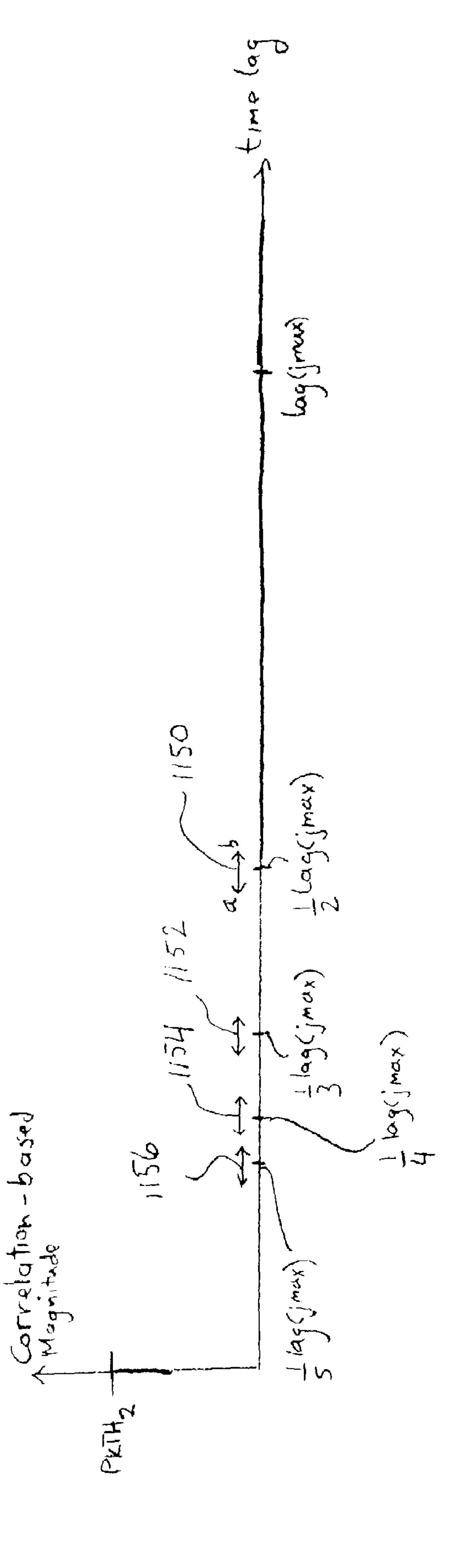
FIG. 11C is a plot of correlation-based magnitude against time lag which serves as an illustration of Algorithm A4 and a portion of the method of FIGS. 11A and 11B.

FIG. 11C is a plot of correlation-based magnitude against time lag which serves as an illustration of Algorithm A4, step (iii)b), and similarly, step 1116 of method 1100. Algorithm A4, step (iii)b) determines whether the time lag of the CLP (lag(im)) coincides with, that is, falls within, any of time lag ranges 1150, 1152, 1154 and 1156, centered around respective time lags lag(jmax)/2, lag(jmax)/3, lag(jmax)/4 and lag(jmax)/5, where lag(jmax) is the time lag of the global maximum peak of the correlation-based signal. If the time lag of the CLP does fall within any of these ranges, then the time lag is returned as the pitch period, assuming the time lag<MAXPPD/2 (step 1114) and the CLP>$PKTH_2$ (step 1112). Embodiments of the present invention include omitting steps 1112 and 1114, which reduces computational complexity, but may also reduce the accuracy of a determined pitch period.

Block 50

Block 50 takes cpp as its input and performs a second-stage pitch period search in the undecimated signal domain to get a refined pitch period pp. Block 50 first converts the coarse pitch period cpp to the undecimated signal domain by multiplying it by the decimation factor D, where D=8 for 16 kHz sampling rate. Then, it determines a search range for the refined pitch period around the value cpp×D. Let MINPP and MAXPP be the minimum and maximum allowed pitch period in the undecimated signal domain, respectively. Then, the lower bound of the search range is lb=max(MINPP, cpp×D−D+1), and the upper bound of the search range is ub=min(MAXPP, cpp×D+D−1). In this embodiment, MINPP=10 and MAXPP=265.

Block 50 maintains an input speech signal buffer with a total of MAXPP+1+FRSZ samples, where FRSZ is the frame size, which is 80 samples for in this embodiment. The last FRSZ samples of this buffer are populated with the input speech signal s(n) in the current frame. The first MAXPP+1 samples are populated with the MAXPP+1 samples of input speech signal s(n) immediately preceding the current frame. Again, without loss of generality, let the index range from n=1 to n=FRSZ denotes the samples in the current frame.

After the lower bound lb and upper bound ub of the pitch period search range are determined, block 50 calculates the following correlation and energy terms in the undecimated s(n) signal domain for time lags that are within the search range [lb, ub].

$$\tilde{c}(k) = \sum_{n=1}^{FRSZ} s(n)s(n-k),\ k = lb, lb+1, \ldots, ub$$

$$\tilde{E}(k) = \sum_{n=1}^{FRSZ} (s(n-k))^2,\ k = lb, lb+1, \ldots, ub$$

The time lag k∈[lb,ub] that maximizes the ratio $\tilde{c}^2(k)/\tilde{E}(k)$ is chosen as the final refined pitch period. That is, $$pp = \max_{k\in[lb,ub]}{}^{-1}\left[\frac{\tilde{c}^2(k)}{\tilde{E}(k)}\right].$$

This completes the description of this embodiment of the present invention.

Generalized and Alternative Embodiments

Figure 12:
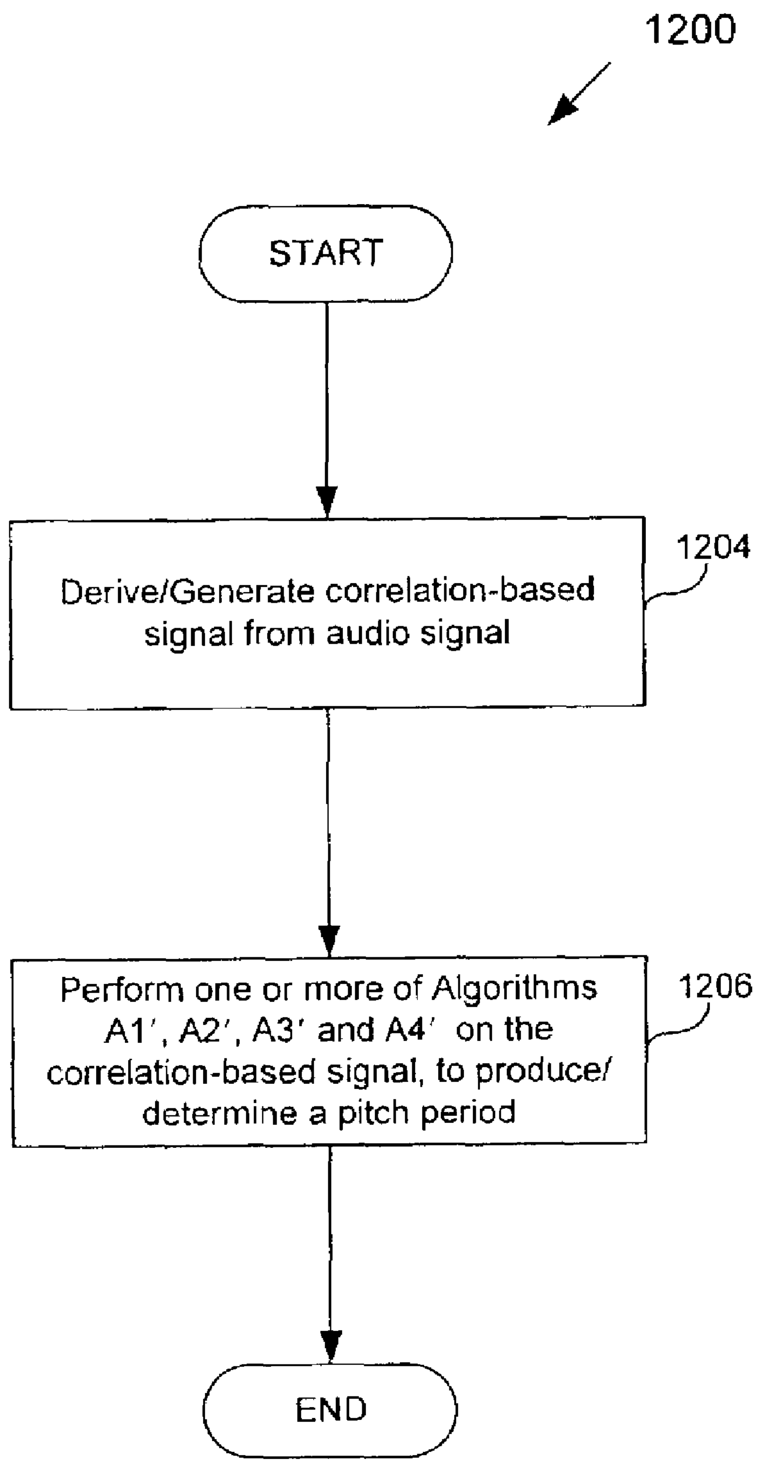
FIG. 12 is a flowchart of an example method, according to an alternative, generalized embodiment of the present invention.

FIG. 12 is a flowchart of a generalized method 1200, according to embodiments of the present invention. Method 1200 encompasses at least portions of the methods and Algorithms described above, in addition to further methods of the present invention. A first step 1204 includes deriving or generating a correlation-based signal from an audio signal. Step 1204 may derive the NCS signal described above, or any other correlation-based signal, such as a correlation square signal that is not normalized, or that is normalized using a signal other than an energy signal. Step 1204 may derive the correlation-based signal from a decimated audio signal, as in steps 202 and 204, or from an audio signal that is not decimated. Thus, the correlation-based signal may include correlation-based signal values corresponding to decimated time lags, or to correlation-based signal values that correspond to non-decimated time lags. The information and results produced in step 1204 are considered known or predetermined for purposes of their further use in subsequent methods.

A next step 1206 includes performing one or more of:

(i) Algorithm A1 or a variation thereof (collectively referred to as Algorithm A1'), to return a pitch period of the audio signal;

(ii) Algorithm A2 or a variation thereof (collectively referred to as Algorithm A2'), to return a pitch period of the audio signal;

(iii) Algorithm A3 or a variation thereof (collectively referred to as Algorithm A3'), to return a pitch period of the audio signal; and (iv) Algorithm A4 or a variation thereof (collectively referred to as Algorithm A4'), to return a pitch period of the audio signal.

For example, step 1206 may include performing only Algorithm A1', only Algorithm A2', only Algorithm A3', or only Algorithm A4'. Alternatively, step 1206 may include performing Algorithm A1' and Algorithm A3', but not Algorithms A2' and A4', and so on. Any combination of Algorithms A1'–A4' may be performed. Performing a lesser number of the Algorithms reduces computational complexity relative to performing a greater number of the Algorithms, but may also reduce the determined pitch period accuracy. A "variation" of any of the Algorithms A1, A2, A3 and A4, may include performing only a portion, for example, only some of the steps of that Algorithm. Also, a variation may include performing the respective Algorithm without using decimated or interpolated correlation-based signals, as described below.

Algorithms A1–A4 have been described above by way of example as depending on both decimated and interpolated correlation-based signals and related variables. It is to be understood that embodiments of the present invention do not require both decimated and interpolated correlation-based signals and variables. For example, Algorithms A3' and A4' and their related methods may process or relate to either decimated or non-decimated correlation-based signals, and may be implemented in the absence of interpolated signals (such as in the absence of interpolated time lags and interpolated peaks). For example, method 900 may operate on local peaks of a non-decimated correlation-based signal, and thus in the absence of interpolated signals.

Figure 13:
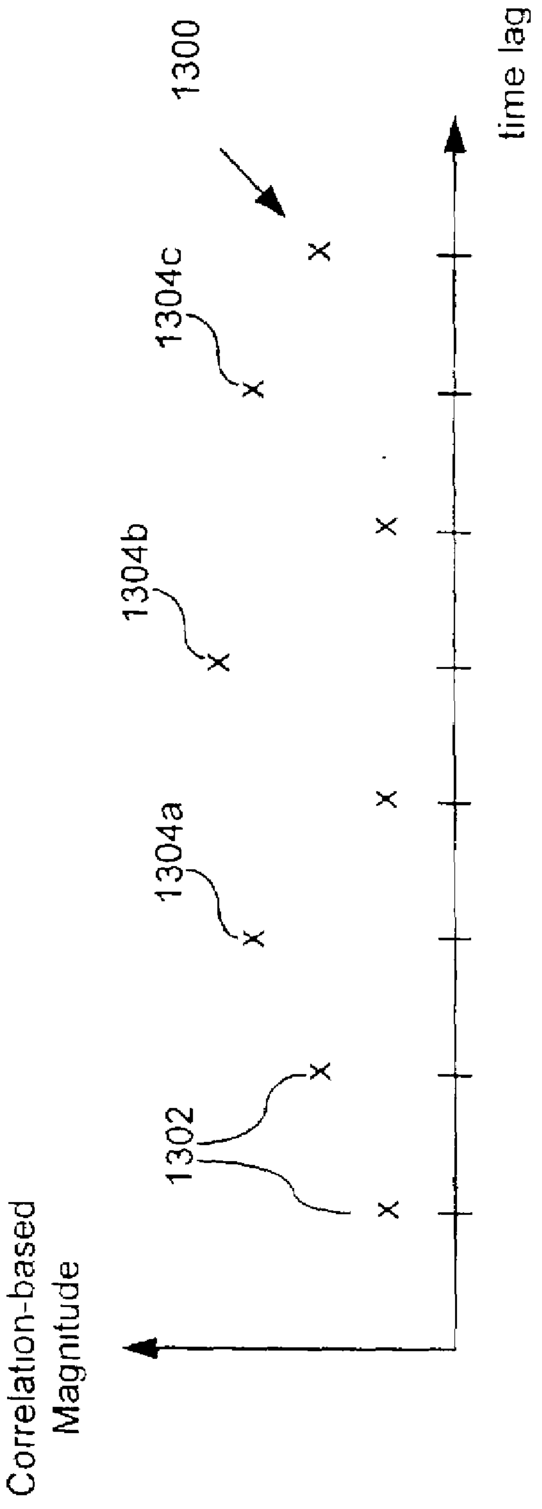
FIG. 13 is a plot of a correlation-based signal 1300 representative of either a decimated or a non-decimated correlation-based signal.

FIG. 13 is a plot of correlation-based magnitude against time lag for a generalized correlation-based signal 1300 (for example, as derived in step 1204 of FIG. 12). Correlation-based signal 1300 includes correlation-based values 1302 extending across the time lag access. Correlation-based signal 1300 includes local peaks 1304*a*, 1304*b*, and 1304*c* for example. Correlation-based signal 1300 includes a global maximum local peak 1304*b*. Correlation-based signal 1300 may be a correlation square signal, an NCS signal, or any other correlation-based signal. Correlation-based signal 1300 may be non-decimated, or alternatively, decimated.

Figure 14:
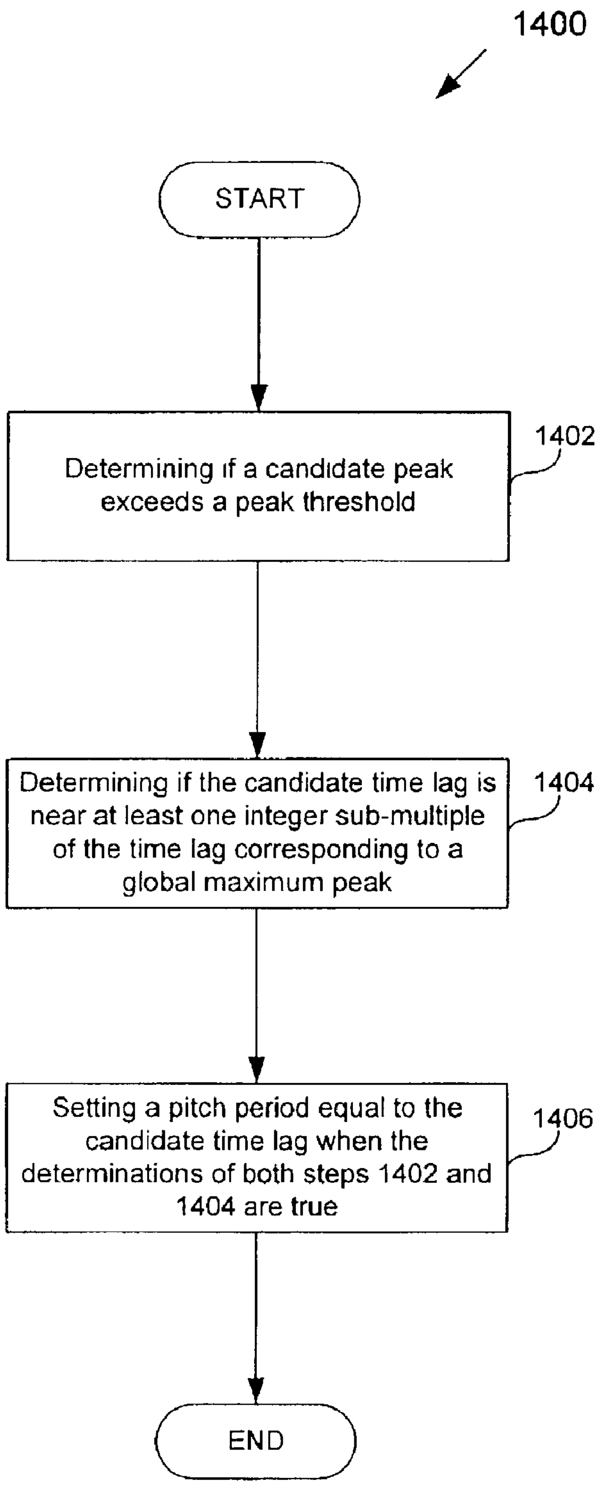
FIG. 14 is a flowchart of a generalized method representative of a portion of Algorithm A4.

FIG. 14 is a flowchart of an example method 1400 for processing a correlation-based signal, such as signal 1300. Method 1400 corresponds generally to steps 1112, 1116 and 1118 of method 1100.

A first step 1402 includes determining if a candidate peak among local peaks 1304 in signal 1300, for example, exceeds a peak threshold.

A next step 1404 includes determining if the candidate time lag corresponding to the candidate peak is near at least one integer sub-multiple of the time lag corresponding to global maximum peak 1304*b* (e.g., of the signal 1300).

A next step 1406 includes setting a pitch period equal to the candidate time lag when the determinations of both steps 1402 and 1404 are true.

This search technique for pitch period extraction is referred to herein as "pitch extraction using sub-multiple, time lag extraction" because of the use of the integer sub-multiples of the time lag corresponding to the global maximum peak.

Systems and Apparatuses

Figure 15:
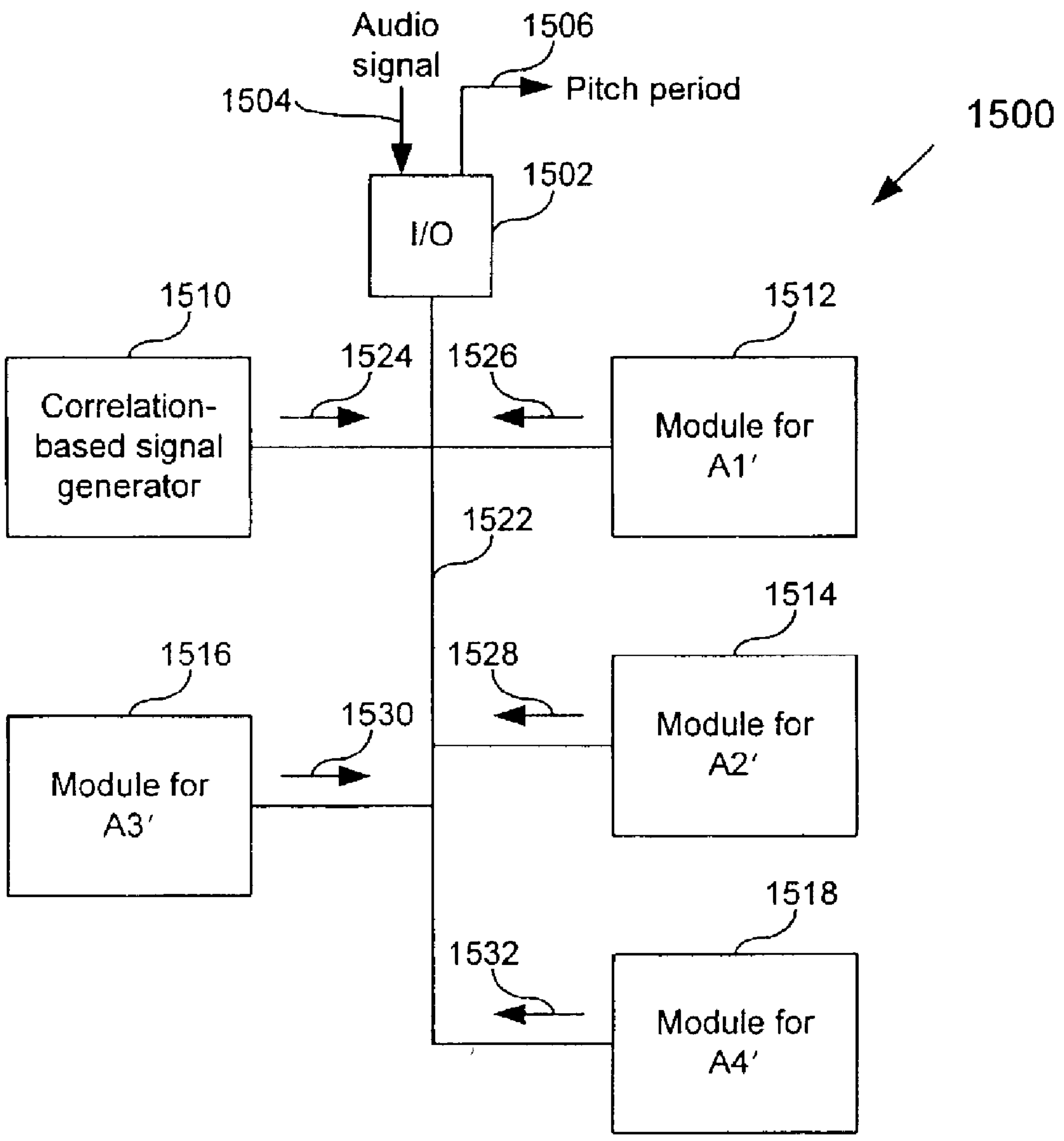
FIG. 15 is a block diagram of an example system/apparatus for performing one or more of the methods of the present invention.

FIG. 15 is a block diagram of an example system 1500 for performing one or more of the methods of the present invention. System 1500 includes an input/output (I/O) block or module 1502 for receiving an audio signal 1504 and for providing a determined pitch period (for example, cpp or pp) 1506 to external users. System 1500 also includes a correlation based signal generator 1510, a module 1512 for performing Algorithm A1' and/or related methods, a module 1514 for performing Algorithm A2' and/or related methods, a module 1516 for performing Algorithm A3' and/or related methods, and a module 1518 for performing Algorithm A4' and/or related methods, all coupled to one another and to I/O module 1502 over or through a communication interface 1522.

Generator 1510 generates or derives correlation-based signal results 1524, such as a correlation values, correlation square values, corresponding energy values, time lags, and so on, based on audio signal 1504. Module 1512 generates results 1526, including interpolated NCS peaks 506 and corresponding lags 510, and determined global maximum interpolated and local peaks 506, and so on. Module 1514 generates results 1528, including a CLP indicator. Module 1516 produces results 1530 in accordance with Algorithm A3', including a determined pitch period when one exists. Module 1518 produces results 1532 in accordance with Algorithm A4', including a determined pitch period. Modules 1502, and 1510–1518 may be implemented in software, hardware, firmware or any combination thereof.

Figure 16:
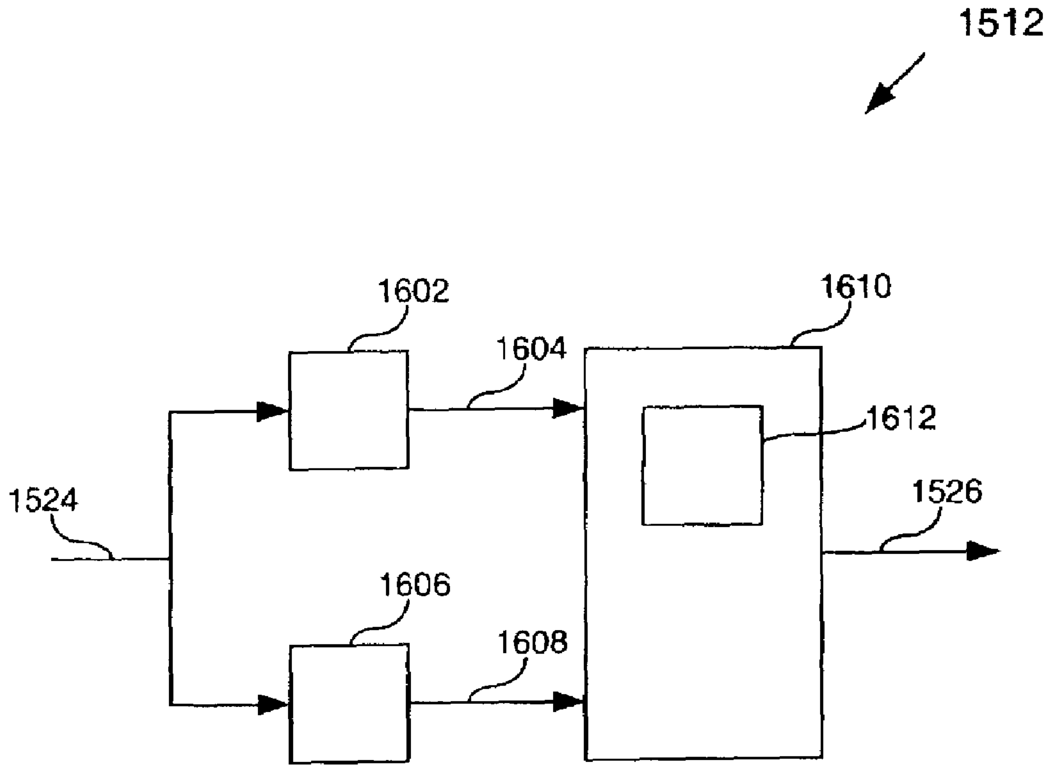
FIG. 16 is a block diagram of an example arrangement of a module of the system of FIG. 15.

FIG. 16 is a block diagram of an example arrangement of module 1512. Module 1512 includes a module 1602 for producing results 1604, including Quadratically Interpolated Correlation (QIC) signal values (e.g., ci) and square QIC signal values (e.g., $ci^2$). For example, module 1512 performs step 708 of method 700. Module 1512 also includes a module 1606 for producing interpolated energy signal values 1608 (e.g., ei) corresponding to square QIC values included in results 1604. For example, module 1512 performs step 710 of method 700. A selector 1610, including a comparator 1612, selects a largest interpolated NCS signal value or NCS peak (represented in results 1604 and 1608) based on cross-multiply compare operations performed by comparator 1612. For example, module 1610 performs step 712 of method 700.

Figure 17:
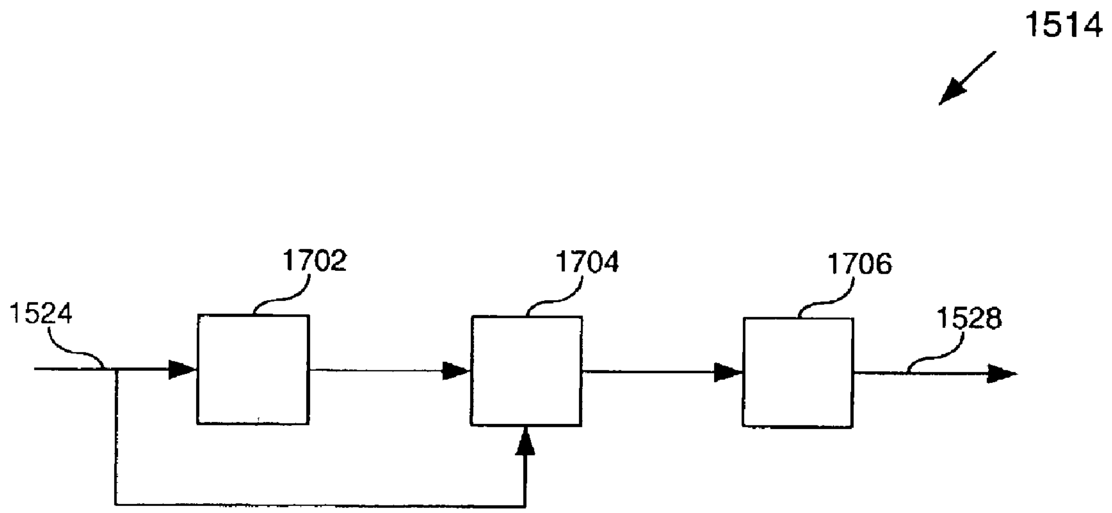
FIG. 17 is a block diagram of an example arrangement of another module of the system of FIG. 15.

FIG. 17 is a block diagram of an example arrangement of module 1514. Module 1514 includes a determiner module 1702 for determining if time lags included in results 1524 are near a previously determined pitch period of audio signal 1504. For example, module 1702 performs step 802 of method 800. Module 1514 includes a comparator 1704 for comparing interpolated peaks corresponding to the time lags determined to be near the previous pitch period (by module 1702). For example, module 1704 performs step 804 of method 800. Module 1514 further include a selector 1706 to select a time lag corresponding to a largest one of the interpolated peaks compared at module 1704. For example, module 1704 performs step 806 of method 800.

Figure 18:
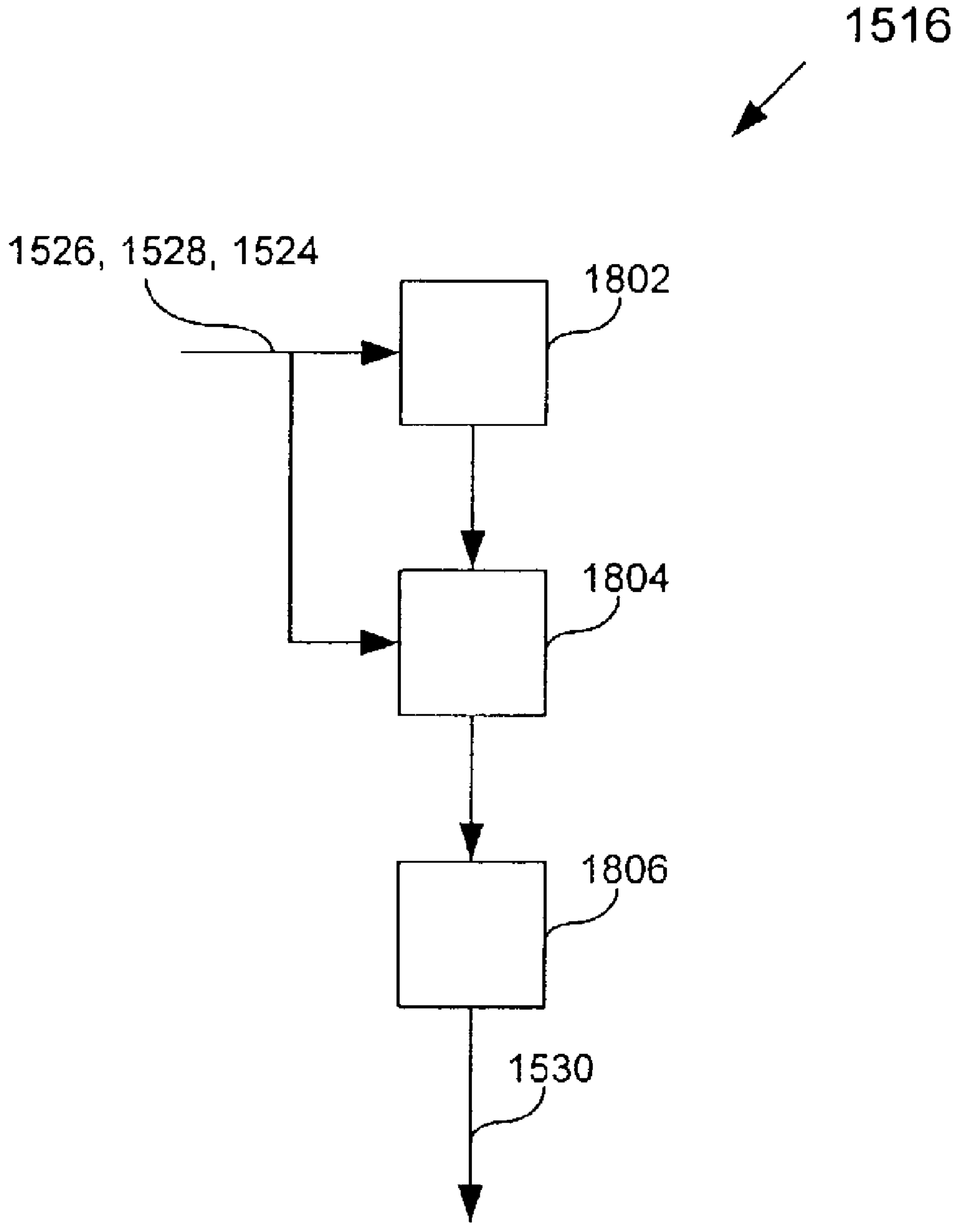
FIG. 18 is an example arrangement of another module of the system of FIG. 15.

FIG. 18 is an example arrangement of module 1516. Module 1516 includes further modules 1802, 1804 and 1806. Signals and indicators flow between modules 1802–1806 as necessary to implement Algorithm A3' as embodied in method 900, for example. Module 1802 performs steps 902–906 of method 900. Module 1804 performs step 908 of method 900. Module 1806 performs at least steps 910 and 912 of method 900, and may also perform one or more of steps 914 and 920 of method 900.

FIG. 19 is a block diagram of an example arrangement of module 1518. Module 1518 includes further modules 1902, 1904, 1906 and 1908. Signals and indicators flow between modules 1902–1908 as necessary to implement Algorithm A4' as embodied in methods 1100 and 1400, for example. Module 1902 performs step 1402 of method 1400, or step 1112 of method 1100. Module 1904 performs step 1404 of method 1400, or step 1116 of method 1100. Module 1906 performs step 1406 of method 1400, or step 1118 of method 1100. Module 1908 performs further conditional logic steps, such as steps 1110, 1112, 1114 and/or 1122 of method 1100, for example.

Hardware and Software Implementations

Figure 20:
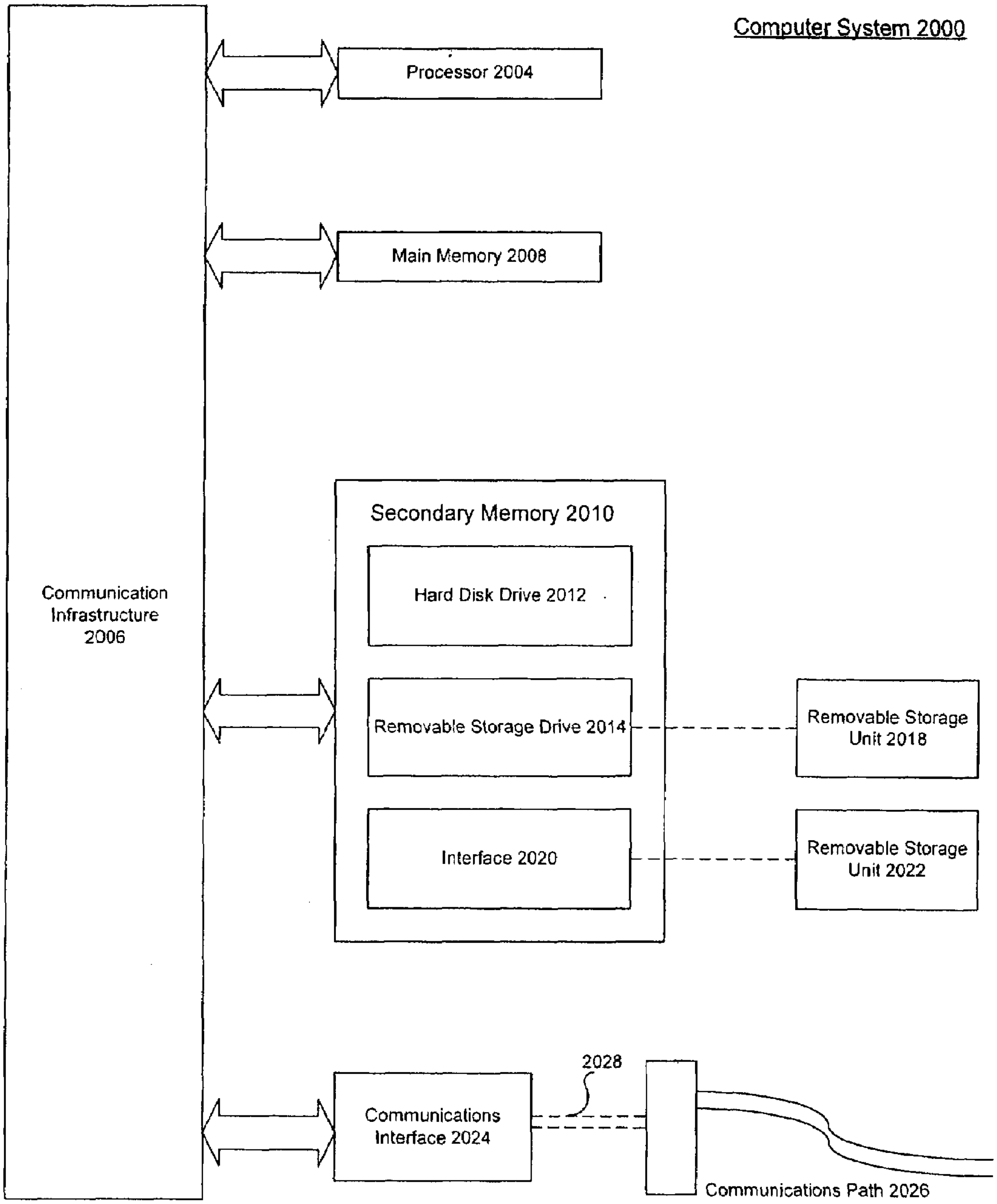
FIG. 20 is a block diagram of a computer system on which embodiments of the present invention may operate.

The following description of a general purpose computer system is provided for completeness. The present invention can be implemented in hardware, or as a combination of software and hardware. Consequently, the invention may be implemented in the environment of a computer system or other processing system. An example of such a computer system 2000 is shown in FIG. 20. In the present invention, all of the signal processing blocks depicted in FIGS. 1 and 15–19, for example, can execute on one or more distinct computer systems 2000, to implement the various methods of the present invention. The computer system 2000 includes one or more processors, such as processor 2004. Processor 2004 can be a special purpose or a general purpose digital signal processor. The processor 2004 is connected to a communication infrastructure 2006 (for example, a bus or network). Various software implementations are described in terms of this exemplary computer system. After reading this description, it will become apparent to a person skilled in the relevant art how to implement the invention using other computer systems and/or computer architectures.

Computer system 2000 also includes a main memory 2008, preferably random access memory (RAM), and may also include a secondary memory 2010. The secondary memory 2010 may include, for example, a hard disk drive 2012 and/or a removable storage drive 2014, representing a floppy disk drive, a magnetic tape drive, an optical disk drive, etc. The removable storage drive 2014 reads from and/or writes to a removable storage unit 2018 in a well known manner. Removable storage unit 2018, represents a floppy disk, magnetic tape, optical disk, etc. which is read by and written to by removable storage drive 2014. As will be appreciated, the removable storage unit 2018 includes a computer usable storage medium having stored therein computer software and/or data. One or more of the above described memories can store results produced in embodiments of the present invention, for example, results stored in Tables 300 and 500, and determined coarse and fine pitch periods, as discussed above.

In alternative implementations, secondary memory 2010 may include other similar means for allowing computer programs or other instructions to be loaded into computer system 2000. Such means may include, for example, a removable storage unit 2022 and an interface 2020. Examples of such means may include a program cartridge and cartridge interface (such as that found in video game devices), a removable memory chip (such as an EPROM, or PROM) and associated socket, and other removable storage units 2022 and interfaces 2020 which allow software and data to be transferred from the removable storage unit 2022 to computer system 2000.

Computer system 2000 may also include a communications interface 2024. Communications interface 2024 allows software and data to be transferred between computer system 2000 and external devices. Examples of communications interface 2024 may include a modem, a network interface (such as an Ethernet card), a communications port, a PCMCIA slot and card, etc. Software and data transferred via communications interface 2024 are in the form of signals 2028 which may be electronic, electromagnetic, optical or other signals capable of being received by communications interface 2024. These signals 2028 are provided to communications interface 2024 via a communications path 2026. Communications path 2026 carries signals 2028 and may be implemented using wire or cable, fiber optics, a phone line, a cellular phone link, an RF link and other communications channels. Examples of signals that may be transferred over interface 2024 include: signals and/or parameters to be coded and/or decoded such as speech and/or audio signals and bit stream representations of such signals; and any signals/parameters resulting from the encoding and decoding of speech and/or audio signals.

In this document, the terms "computer program medium" and "computer usable medium" are used to generally refer to media such as removable storage drive 2014, a hard disk installed in hard disk drive 2012, and signals 2028. These computer program products are means for providing software to computer system 2000.

Computer programs (also called computer control logic) are stored in main memory 2008 and/or secondary memory 2010. Also, decoded speech frames, filtered speech frames, filter parameters such as filter coefficients and gains, and so on, may all be stored in the above-mentioned memories. Computer programs may also be received via communications interface 2024. Such computer programs, when executed, enable the computer system 2000 to implement the present invention as discussed herein. In particular, the computer programs, when executed, enable the processor 2004 to implement the processes of the present invention, such as Algorithms A1–A4, A1'–A4', and the methods illustrated in FIGS. 2, 7–12, and 14, for example. Accordingly, such computer programs represent controllers of the computer system 2000. By way of example, in the embodiments of the invention, the processes/methods performed by signal processing blocks of quantizers and/or inverse quantizers can be performed by computer control logic. Where the invention is implemented using software, the software may be stored in a computer program product and loaded into computer system 2000 using removable storage drive 2014, hard drive 2012 or communications interface 2024.

In another embodiment, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

9. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Also, the order of method steps may be rearranged. Any such alternate boundaries are thus within the scope and spirit of the claimed invention. One skilled in the art will recognize that these functional building blocks can be implemented by firmware, discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A method of searching for an interpolated peak of a Normalized Correlation Square (NCS) signal derived from an audio signal, the NCS signal being represented as a first ratio of a correlation square signal $c^2(k)$ to an energy signal E(k), where k represents time lags spanning a range of integer k-values, the interpolated peak being near a known local peak $c^2(k_p)/E(k_p)$ of the NCS signal, comprising:

(a) producing quadratically interpolated correlation (QIC) signal values (ci) at interpolated time lags between time lag $k_p$ and an adjacent time lag;

(b) squaring each of the QIC signal values to produce square QIC signal values ($ci^2$);

(c) producing an individual interpolated energy signal value (ei) corresponding to each of the square QIC signal values, wherein second ratios of the square QIC signal values ($ci^2$) to their corresponding interpolated energy values (ei) represent interpolated NCS signal values; and (d) selecting, as the interpolated peak, a largest interpolated NCS signal value among the interpolated NCS signal values without evaluating the second ratios.

2. The method of claim 1, wherein step (d) comprises:

comparing the interpolated NCS signal values to each other using cross-multiply compare operations, so as to avoid evaluating the second ratios representing the NCS values; and selecting the largest interpolated NCS signal value among the interpolated NCS signal values based on said comparing step.

3. The method of claim 1, wherein the NCS signal includes multiple known local peaks $c^2(k_p(j))/E(k_p(j))$, including the known local peak searched in steps (a), (b), (c) and (d), where j=1, 2, . . . $N_p$, the method further comprising:

(e) repeating steps (a), (b), (c) and (d) for each of the remaining known local peaks among the $N_p$ local peaks, thereby selecting an interpolated peak near each of the $N_p$ local peaks.

4. The method of claim 3, further comprising:

determining a largest interpolated peak among the $N_p$ interpolated peaks; and an interpolated time lag corresponding to the largest interpolated peak.

5. The method of claim 1, further comprising:

prior to step (a), comparing NCS signal values $c^2(k_p+1)/E(k_p+1)$ and $c^2(k_p-1)/E(k_p-1)$, that are adjacent neighbors of the local peak $c^2(k_p)/E(k_p)$; and wherein step (a) comprises interpolating between time lags $k_p$ and $k_p+1$ when said comparing step indicates the interpolated peak resides between time lags $k_p$ and $k_p+1$, and otherwise interpolating between time lags $k_p$ and $k_p-1$.

6. The method of claim 1, wherein the NCS signal is a decimated signal such that k represents decimated time lags, the time lags $k_p$ is a decimated time lag, and the adjacent time lag is a decimated time lag.

7. The method of claim 1, wherein the interpolated time lag selected in step (c) is representative of the audio signal pitch period.

8. A method of searching for an interpolated time lag representative of an audio signal pitch period, the method using a correlation-based signal derived from an audio signal swd(n), the correlation-based signal having $N_p$ local peaks at corresponding known time lags $k_p(j)$, where j=1, 2, . . . $N_p$, each of the $N_p$ local peaks being near a corresponding one of interpolated correlation-based peaks, each of the interpolated correlation-based peaks corresponding to an interpolated time lag, the method comprising:

(a) determining if any of the time lags $k_p(j)$ are within a predetermined time lag range, the predetermined time lag range including a time lag representative of a past pitch period of a past portion of the audio signal;

(b) comparing the interpolated peaks corresponding to the time lags determined to be within the predetermined time lag range; and (c) selecting the interpolated time lag corresponding to a largest interpolated peak among the interpolated peaks compared in step (b).

9. The method of claim 8, wherein the interpolated correlation-based peaks are Normalized Correlation Square (NCS) peaks represented as respective ratios of interpolated correlation square values to corresponding interpolated energy values, and step (b) includes performing a cross-multiply comparison operation between at least two of the interpolated peaks so as to avoid evaluating the ratios representing the at least two of the interpolated peaks.

10. A computer readable medium carrying one or more sequences of one or more instructions for execution by one or more processors to perform a method of searching for an interpolated peak of a Normalized Correlation Square (NCS) signal derived from an audio signal, the NCS signal being represented as a first ratio of a correlation square signal $c^2(k)$ to an energy signal E(k), where k represents time lags spanning a range of integer k-values, the interpolated peak being near a known local peak $c^2(k_p)/E(k_p)$ of the NCS signal, the instructions when executed by the one or more processors, causing the one or more processors to perform the steps of:

(a) producing quadratically interpolated correlation (QIC) signal values (ci) at interpolated time lags between time lag $k_p$ and an adjacent time lag;

(b) squaring each of the QIC signal values to produce square QIC signal values ($ci^2$);

(c) producing an individual interpolated energy signal value (ei) corresponding to each of the square QIC signal values, wherein second ratios of the square QIC signal values ($ci^2$) to their corresponding interpolated energy values (ei) represent interpolated NCS signal values; and (d) selecting, as the interpolated peak, a largest interpolated NCS signal value among the interpolated NCS signal values without evaluating the second ratios.

11. The computer readable medium of claim 10, wherein step (d) comprises:

comparing the interpolated NCS signal values to each other using cross-multiply compare operations, so as to avoid evaluating the second ratios representing the NCS values; and selecting the largest interpolated NCS signal value among the interpolated NCS signal values based on said comparing step.

12. The computer readable medium of claim 10, wherein the NCS signal includes multiple known local peaks $c^2(k_p(j))/E(k_p(j))$, including the known local peak searched in steps (a), (b), (c) and (d), where j=1, 2, . . . $N_p$, and wherein the one or more instructions carried by the computer readable medium cause the one or more processors to perform the further step of:

(e) repeating steps (a), (b), (c) and (d) for each of the remaining known local peaks among the $N_p$ local peaks, thereby selecting an interpolated peak near each of the $N_p$ local peaks.

13. The computer readable medium of claim 12, wherein the one or more instructions carried by the computer readable medium cause the one or more processors to perform the further steps of:

determining a largest interpolated peak among the $N_p$ interpolated peaks; and an interpolated time lag corresponding to the largest interpolated peak.

14. The computer readable medium of claim 10, wherein the one or more instructions carried by the computer readable medium cause the one or more processors to perform, prior to step (a), the step of:

comparing NCS signal values $c^2(k_p+1)/E(k_p+1)$ and $c^2(k_p-1)/E(k_p-1)$, that are adjacent neighbors of the local peak $c^2(k_p)/E(k_p)$, wherein step (a) comprises interpolating between time lags $k_p$ and $k_p+1$ when said comparing step indicates the interpolated peak resides between time lags $k_p$ and $k_p+1$, and otherwise interpolating between time lags $k_p$ and $k_p-1$.

15. The computer readable medium of claim 10, wherein the NCS signal is a decimated signal such that k represents decimated time lags, the time lags $k_p$ is a decimated time lag, and the adjacent time lag is a decimated time lag.

16. A computer readable medium carrying one or more sequences of one or more instructions for execution by one or more processors to perform a method of searching for an interpolated time lag representative of an audio signal pitch period, the method using a correlation-based signal derived from an audio signal swd(n), the correlation-based signal having $N_p$ local peaks at corresponding known time lags $k_p(j)$, where j=1, 2, . . . $N_p$, each of the $N_p$ local peaks being near a corresponding one of interpolated correlation-based peaks, each of the interpolated correlation-based peaks corresponding to an interpolated time lag, the instructions when executed by the one or more processors, causing the one or more processors to perform the steps of:

(a) determining if any of the time lags $k_p(j)$ are within a predetermined time lag range, the predetermined time lag range including a time lag representative of a past pitch period of a past portion of the audio signal;

(b) comparing the interpolated peaks corresponding to the time lags determined to be within the predetermined time lag range; and (c) selecting the interpolated time lag corresponding to a largest interpolated peak among the interpolated peaks compared in step (b).

17. The computer readable medium of claim 16, wherein the interpolated correlation-based peaks are Normalized Correlation Square (NCS) peaks represented as respective ratios of interpolated correlation square values to corresponding interpolated energy values, and step (b) includes performing a cross-multiply comparison operation between at least two of the interpolated peaks so as to avoid evaluating the ratios representing the at least two of the interpolated peaks.

18. An apparatus for searching for an interpolated peak of a Normalized Correlation Square (NCS) signal derived from an audio signal, the NCS signal being represented as a first ratio of a correlation square signal $c^2(k)$ to an energy signal E(k), where k represents time lags spanning a range of integer k-values, the interpolated peak being near a known local peak $c^2(k_p)/E(k_p)$ of the NCS signal, comprising:

a first module for producing quadratically interpolated correlation (QIC) signal values (ci) at interpolated time lags between time lag $k_p$ and an adjacent time lag, and squaring each of the QIC signal values to produce square QIC signal values ($ci^2$);

a second module for producing an individual interpolated energy signal value (ei) corresponding to each of the square QIC signal values, wherein second ratios of the square QIC signal values ($ci^2$) to their corresponding interpolated energy values (ei) represent interpolated NCS signal values; and a third module for selecting, as the interpolated peak, a largest interpolated NCS signal value among the interpolated NCS signal values without evaluating the second ratios.

19. The apparatus of claim 18, wherein the third module is configured to:

compare the interpolated NCS signal values to each other using cross-multiply compare operations, so as to avoid evaluating the second ratios representing the NCS values; and select the largest interpolated NCS signal value among the interpolated NCS signal values based on results from the compare operation.

20. An apparatus for searching for an interpolated time lag representative of an audio signal pitch period, the method using a correlation-based signal derived from an audio signal swd(n), the correlation-based signal having $N_p$ local peaks at corresponding known time lags $k_p(j)$, where j=1, 2, . . . $N_p$, each of the $N_p$ local peaks being near a corresponding one of interpolated correlation-based peaks, each of the interpolated correlation-based peaks corresponding to an interpolated time lag, comprising:

a first module for determining if any of the time lags $k_p(j)$ are within a predetermined time lag range, the predetermined time lag range including a time lag representative of a past pitch period of a past portion of the audio signal;

a second module for comparing the interpolated peaks corresponding to the time lags determined to be within the predetermined time lag range; and a third module for selecting the interpolated time lag corresponding to a largest interpolated peak among the interpolated peaks compared by the second module.

* * * * *